United States Patent
Simon

(10) Patent No.: US 8,824,768 B1
(45) Date of Patent: Sep. 2, 2014

(54) FERTILIZATION TEST METHOD AND APPARATUS

(71) Applicant: Blair K. Simon, Clinton, MA (US)

(72) Inventor: Blair K. Simon, Clinton, MA (US)

(*) Notice: Subject to any disclaimer, the term of this patent is extended or adjusted under 35 U.S.C. 154(b) by 126 days.

(21) Appl. No.: 13/675,693

(22) Filed: Nov. 13, 2012

Related U.S. Application Data

(60) Provisional application No. 61/558,348, filed on Nov. 10, 2011.

(51) Int. Cl.
*G06K 9/00* (2006.01)

(52) U.S. Cl.
USPC ............ 382/133; 382/100; 382/203; 382/218

(58) Field of Classification Search
CPC ... G06K 9/00127; G06K 9/48; G06K 9/6204; G06T 2207/30024; G06T 7/0012; G06T 2207/10056; G01N 15/1475
USPC .................................. 382/133, 100, 203, 218
See application file for complete search history.

(56) References Cited

U.S. PATENT DOCUMENTS

2012/0028342 A1* 2/2012 Ismagilov et al. ......... 435/283.1

OTHER PUBLICATIONS

Edmond J. Breen and Ronald Jones, Attribute Openings, Thinnings, and Granulometries, Computer Vision and Image Understanding, vol. 64 No. 3, pp. 377-389 (Nov. 1996).

Luc Vincent, Morphological Grayscale Image Reconstruction in Image Analysis: Applications and Efficient Algorithms, IEEE Transactions on Image Processing, vol. 2, No. 2, pp. 176-201 (Apr. 1993).
Calvin J. Maurer and Vijay Raghaven, A Linear Time Algorithm for Computing Exact Euclidean Distance Transforms of Binary Images in Arbitrary Dimensions, IEEE Transactions on Pattern Analysis and Machine Intelligence, vol. 25, No. 2, pp. 265-270 (Feb. 2003).
Fernand Meyer, Topographic Distance and Watershed Lines, Signal Processing 38, pp. 113-125 (1994).
John Canny, A Computational Approach to Edge Detection, IEEE Transactions on Pattern Analysis and Machine Intelligence, vol. PAMI-8, No. 6 pp. 679-698 (Nov. 1986).
Genevieve Coath and Phillip Musumeci, Adaptive Arc Fitting for Ball Detection in RoboCup, APRS Workshop on Digital Image Computing, pp. 63-68, (2003).
T.J. Atherton and D.J. Kerbyson, The Coherent Circle Hough Transform, Proceedings of the British Machine Vision, pp. 269-278, (1993).
10. C.A. Glasbey, An Analysis of Histogram-Based Thresholding Algorithms, CVGIP: Graphical Models and Image Processing, pp. 532-537 (1993).

(Continued)

*Primary Examiner* — Ruiping Li
(74) *Attorney, Agent, or Firm* — Mesmer & Deleault, PLLC; Ross K. Krutsinger

(57) ABSTRACT

From a sample image, a fertilization test method determines the ratio of fertilized cells in the image by identifying cells in the image and calculating cell properties for each cell. An area is determined between a cell body and an outer search limit to search for a fertilization membrane. A cell outline is defined for each cell and cell membrane edges are found within the search area by changing the cell outline size between the cell body boundary the outer search limit, checking for a match with detected cell membrane edges. A cell is determined to be fertilized based on matches between detected cell membrane edges and the cell outline, patterns of contrast changes indicated by a cell membrane, or circles fit to cell membrane edges.

20 Claims, 17 Drawing Sheets

(56) References Cited

OTHER PUBLICATIONS

J.M.S. Prewitt and M.L. Mendelsohn, The Analysis of Cell Images, Annals of New York Academy of Sciences, pp. 1035-1053 (1966).

12. P. A. Thistlethwaite, J. L. Ronsky and H.S. Gill, Fast and Robust Marker Detection With Roentgen Stereophotogrammetric Analysis, Summer Bioengineering Conference, pp. 1223-1224 (2003).

Dave Hale, 3-D Depth Migration Via McClellan Transformations, Geophysics vol. 56 No. 11 pp. 1778-1785 (Nov. 1991).

John M Weiss, South Dakota School of Mines and Technology, "Real-Time Feature Detection Using The Hough Transform," Dept of Mathematics and Computer Science Inaugural Lecture (Sep. 17, 2008).

Michael D Breitenstein et al., Robust Tracking-by-Detection using a Detector Confidence Particle Filter, IEEE 12th International Conference on Computer Vision pp. 1515-1522 (2009).

Michael K. Cheezum et al., Quantitative Comparison of Algorithms for Tracking Single Fluorescent Particles, Biophysical Journal vol. 81 pp. 2378-2388 (Oct. 2001).

Pierre Soille, Morphological Image Analysis: Principles and Applications, abstract (Springer-Verlag 1999).

R. C. Gonzalez et al., Digital Image Processing Using MATlAB, abstract (Pearson Prentice Hall 2004).

Mathworks, Marker-Controlled Watershed Segmentation Demo, available at http://www.mathworks.com/products/image/examples.html?file=/products/demos/shipping/images/ipexwatershed.html (last visited Nov. 14, 2012).

Mathworks, Identifying Round Objects Demo, available at http://www.mathworks.com/products/image/examples.html?file=/products/demos/shipping/images/ipexroundness.html (last visited Nov. 14, 2012).

Mathworks, Detecting a Cell Using Image Segmentation Demo, available at http://www.mathworks.com/products/image/examples.html?file=/products/demos/shipping/images/ipexcell.html (last visited Nov. 14, 2012).

\* cited by examiner

FERTILIZATION TEST METHOD AND APPARATUS

This application claims the benefit of U.S. Provisional Patent Application No. 61/558,348 filed on Nov. 10, 2011.

BACKGROUND OF THE INVENTION

1. Field of the Invention

The present invention relates generally to analytical methods. In particular, the present invention relates to a fertilization test method and apparatus.

2. Description of the Prior Art

For compliance with the federal Clean Water Act, municipalities and private business have the task of measuring the contaminant level in surface water and discharge streams. One test used to determine contaminant levels involves a fertilization test, which determines the ratio of fertilized to unfertilized sea urchin (*Arbacia punctulata*) eggs and compares that ratio with a control sample.

A lab technician traditionally uses a pipette to dispense a water sample onto a microscope slide and then covers the sample with a slide cover slip. The technician then views the water sample through a bright field microscope at about 100× magnification. The technician visually scans the water sample looking for fertilized eggs as indicated by a fertilization membrane surrounding the egg. The presence of a membrane, or halo, around the outside of the egg confirms that the sea urchin egg has been successfully fertilized.

The water sample may contain between 30 and 45 counting chambers, each of which contain many sea urchin eggs of between 100-250 µm in diameter. The lab technician uses the microscope's micropositioner to move the slide and analyze the entire sample for sea urchin eggs, typically examining at least 100 sea urchin eggs for the presence of a fertilization membrane, which may be between 1 and 10 µm thick. The lab technician manually counts the number of fertilized and unfertilized eggs in the sample. The technician reports the percentage of fertilized eggs in each sample and compares that percentage to control samples. A difference between the percentage of fertilized eggs in the sample and the percentage of fertilized eggs in the control sample indicates the presence of toxins in the water sample. According to Environmental Protection Agency guidelines, a representative sample should include a count of at least 100 eggs.

Because a fertilization test is performed manually, it requires significant time of an employee having the expertise and training to complete the test. A trained lab technician typically requires between one and two hours to complete a fertilization test for each water sample. While five to ten tests may be performed at one time, a lab technician may analyze many samples per customer.

Other analytical methods have been used to analyze cells in related fields. A flow cytometry system or "FACS machine" sort cells based on the size or growth of the cell. This analytical method is frequently used for antibody coupling analysis in DNA and red blood cells. Hematoxylin and eosin stain techniques, sometimes referred to as an HE section, use red and blue dyes to emphasize various components of cell structure based on color differences of the cell components. The HE section technique has been automated in medical diagnosis equipment.

SUMMARY OF THE INVENTION

The traditional method used to count and analyze fertilized eggs is time consuming, expensive, and tedious. Because of its high labor cost, the test generates low profit margins for environmental testing laboratories. Also, because of the manual and subjective nature of the test, the fertilization test is prone to accuracy and precision problems as a result of human error or a simple failure to perform the tedious test as required. To compound the problems of reliability and cost, traditional fertilization test results can only be verified for accuracy by having the test repeated by another lab technician. These problems are not solved by analytical methods, such as HE sections and flow cytometry used in related fields, because these methods do not determine the presence of a fertilization membrane.

Therefore, what is needed is a method and apparatus to analyze the toxicity of aqueous samples by performing a fertilization test where the method increases accuracy while also reducing human error and manual labor costs. It is an object of the invention to provide an improved method for quantifying the number of fertilized eggs in an aqueous sample.

It is also an object of the present invention to provide a fertilization test method having a reduced cost over traditional methods performed by a lab technician.

It is another object of the present invention to improve the reliability of fertilization test results.

It is another object of the invention to provide a fertilization test method having improved accuracy and precision. The present invention achieves these and other objectives by providing a fertilization test method and apparatus.

In one embodiment of the method, steps include inputting a sample image to a processor, where the sample image has a plurality of pixels and an image border. The processor detects contours in the sample image and identifies one or more cells in the sample image based on the detected contours in the sample image. The processor calculates at least one cell property for each of the one or more cells identified in the sample image, such as a cell body area, a cell body radius, a cell body diameter, a major diameter of an ellipse inscribing the cell body, a minor diameter of an ellipse inscribing the cell body, a major axis of a parabola inscribing the cell body, a minor axis of a parabola inscribing the cell body, coordinates of a cell location, coordinates of a cell body centroid, coordinates of a cell body boundary; a bounding box enclosing the cell, and a bounding box enclosing the cell and cell membrane.

The processor defining an outer search limit is defined, including a bounding box within the image border and enclosing one of the one or more cell bodies based on the calculated at least one cell property; a bounding region within the image border; and the image border. A search area is determined outside of a cell body and within the outer search limit to search for cell membrane edges. The processor defines a cell outline having a cell outline size, where the cell outline is (i) a cell hull based on the cell body boundary, (ii) the cell body boundary, and (iii) a plurality of points making up the cell body boundary. At least one cell membrane edge is found in the search area by adjusting the cell outline size between the cell body boundary and the outer search limit and checking for matches between the cell outline and the detected cell membrane edges. The processor determines whether a cell is fertilized based on one of several methods that include (a) matches between the cell outline and the detected cell membrane edges, where a cell is determined to be fertilized when the cell has a first membrane edge radially spaced from a second membrane edge and wherein the first membrane edge and the second membrane edge each match detected edges in the sample image to at least the extent of a match threshold value; (b) an alternating pattern on a first cell radial line segment and an alternating pattern on a second cell radial line segment, wherein the cell is determined to be fertilized when the alternating pattern on the first cell radial line segment matches the alternating pattern on the second cell radial line segment and wherein each alternating pattern indicates a region radially between the cell body boundary and a first cell membrane edge, a first cell membrane edge, a region radially between the first cell membrane edge and a second cell membrane edge, the second cell membrane edge, and a region radially beyond the second cell membrane edge, and (iii) circles fit to match each of a first membrane edge and a second membrane edge.

In another embodiment of the method, a cell having a cell body area outside of values between a maximum cell size threshold value and a minimum cell size threshold value is excluded from analysis.

In another embodiment of the method, the minimum cell size threshold value is about 1 pixel per 24 sample image pixels. In another embodiment of the method, the maximum cell size threshold value is about 1 pixel per 12 sample image pixels.

In another embodiment of the method, a connected pixel region in the sample image is excluded from analysis when it has an area below an area threshold value;

In another embodiment, method steps also include calculating a value for cell body boundary goodness-of-fit with a Gaussian ring having a radius based on one or more calculated cell property. A cell having a goodness-of-fit value below a fit threshold value is excluded from analysis. In one embodiment, the cell body boundary goodness-of-fit is at least 200 based on two-dimensional cross-correlation between a pixel array including the cell boundary and a pixel array including the Gaussian ring.

In another embodiment of the method, cells in the sample image having a pixel connected to a pixel of the sample image border are excluded from analysis.

In another embodiment of the method, the step of acquiring the sample image is included.

Another embodiment of the method includes the step of removing noise pixels from the sample image, wherein the noise pixels comprise at least one of bright noise pixels and dark noise pixels. In one embodiment, the noise pixels comprise a connected pixel area that is less than three percent of the minimum cell size threshold value (1 pixel per about 820 sample image pixels).

In another embodiment, determining whether a cell is fertilized is based on matches between the cell outline and the detected cell membrane edges. In this embodiment, the match threshold value is fifteen percent. In another embodiment, the cell outline size is adjusted in increments of one pixel.

In another embodiment, determining whether a cell is fertilized is based on matches between the cell outline and the detected cell membrane edges and includes the steps of determining locations where the cell outline matches a detected edge for each cell outline size and determining a number of consecutive matches for cell outline sizes between the cell body boundary and the outer search limit. In one embodiment, the first membrane edge is indicated by an occurrence of matches between the cell outline and the detected edge for at least two consecutive cell outline sizes. In another embodiment, the second membrane edge is indicated by an occurrence of matches between the cell outline and the detected edge for at least two consecutive cell outline sizes. In another embodiment, the second membrane edge being radially spaced from the first membrane edge is indicated by a region of matches to an extent below the match threshold value between the first membrane edge and the second membrane edge.

In another embodiment of the method, the edge is defined by change in pixel brightness.

In another embodiment, the method includes the steps of dilating one or more pixels and eroding one or more pixels, where dilating and eroding are performed using one or more structuring elements, such as a disk-shaped structuring element, a rectangular structuring element, a horizontal line structuring element, and a vertical line structuring element.

In one embodiment, the method is performed using a MATLAB computing platform.

An apparatus for performing automated fertilization tests on an aqueous sample comprises a CCD for acquiring an image sample, a lens providing magnification of a sample and focusing the sample on the CCD, a microprocessor configured to perform image processing calculations and being disposed in communication with the CCD; a data storage device in communication with the microprocessor, and a display device in communication with the microprocessor and data storage device. In one embodiment, the CCD is configured to acquire an RGB image having a resolution of 1280× 960 pixels. The microprocessor is configured to determine a fertilization ratio based on the above-mentioned method.

DETAILED DESCRIPTION OF THE PREFERRED EMBODIMENT

The preferred embodiments of the present invention are illustrated in FIGS. 1-19.

Apparatus

Figure 1:
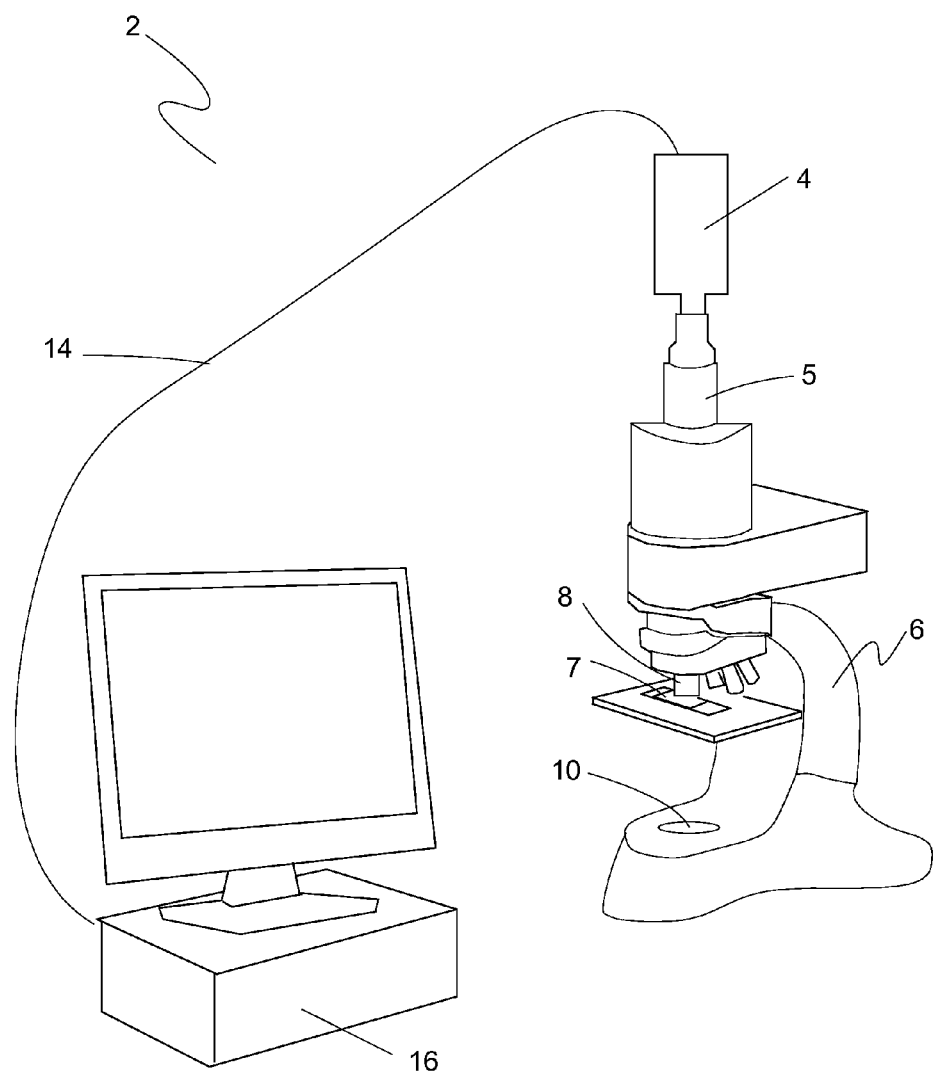
FIG. 1 shows one embodiment of an apparatus used to perform a fertilization test of the present invention.
Figure 2:
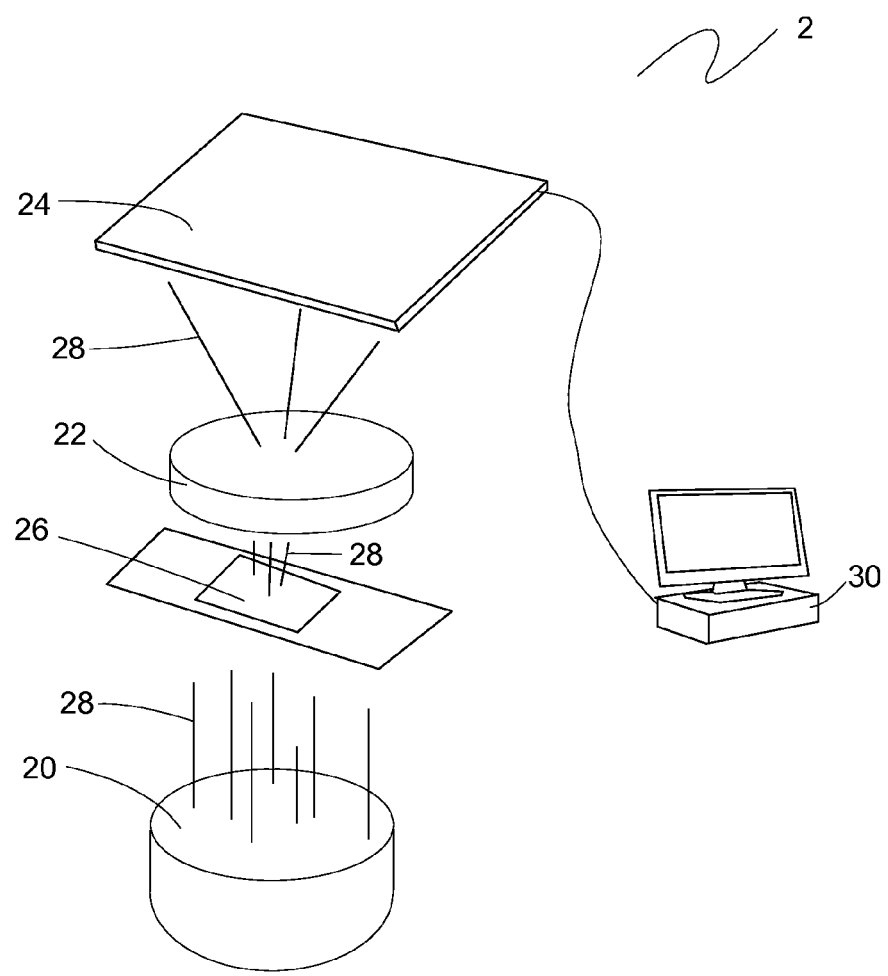
FIG. 2 shows another embodiment of an apparatus used to perform a fertilization test of the present invention.

FIGS. 1 and 2 illustrate exemplary embodiments of an apparatus 2 used to perform an automated fertilization test. Referring to FIG. 1, one embodiment of apparatus 2 has an image capture device 4 connected to a laboratory microscope 6 with standard optics 8 and a bright field light source 10. In one embodiment, image capture device 4 is a charge coupled device ("CCD") or CCD camera mounted directly above a microscope objective 5. In other embodiments, image capture device 4 is a CMOS detector or any other detector capable of acquiring a sample image. As used herein, a CCD is an integrated circuit having an array of light sensitive pixels. Light incident to a CCD pixel array generates a charge that is readable by a computer and turned into a digital image of the light patterns falling on the device. CCDs come in many sizes and shapes, and are adapted for use in digital cameras, scientific devices, and other applications. A CCD may acquire color and/or black and white (grayscale) images.

Image capture device 4 captures one or more images of a sample 7 to be analyzed. Sample 7 in one embodiment is an aqueous sample that is conventionally prepared on a glass slide with a cover slip. Image capture device 4 is coupled to a computer or microprocessor 16 for displaying the captured image, performing operations on the captured image, performing calculations, storing data, and reporting results. In one embodiment, image capture device 4 is a CCD camera mounted to a microscope 6 to capture images of a magnified sample 7. The CCD camera is connected to computer 16 with a cable 14 adequate to deliver images to computer 16. In another embodiment, image capture device 4 is a CCD camera that communicates wirelessly with computer 16 or supplies images to computer 16 via the Internet or a data storage medium.

As shown in FIG. 2, another embodiment of apparatus 2 has a light source 20, one or more lenses or optics 22 as needed, and a CCD 24 disposed in communication with a computer or processor 30. A sample 26 is preferably positioned between light source 20 and CCD 24 with optics 22 to appropriately magnify and/or focus light 28 transmitted through sample 26 to CCD 24. In another embodiment, light source 20 illuminates sample from above and CCD 24 acquires an image based on light reflected from sample 26 to CCD 24.

Apparatus 2 may be modified to perform sample analysis for a fertilization test where the sample image is acquired from still or flowing samples. In one embodiment, an aqueous water sample flows through a cuvette or container and images of the flowing sample are captured using a CCD appropriately configured for such an application. In one embodiment, for example, an autosampler is used to capture images of an aqueous sample that is flowing or pumped through a flow chamber as part of microscope 6. In such an embodiment, the speed of computer 20 and image capture device 4 determine an appropriate solution flow rate. Preferably, a dissecting microscope is used with a rectangular flow chamber made of non-distorting glass plates. In one embodiment, the passageway defined by the flow chamber is slightly larger than the size of a sea urchin egg so the eggs pass through the flow chamber one at a time in a linear fashion.

Limitations of the method and apparatus of the present invention include the size of the light-sensitive pixels and the number of those pixels that make up the CCD. In theory, the method of the present invention works provided that the features to be analyzed are larger than 1 pixel in size and the color or pixel intensity gradient of those features has a slope that is steeper than that of the surrounding background. A relationship exists between the number of pixels needed for a feature to be detected and the slope of the pixel intensity gradient of a feature: having fewer pixels in a feature requires an increased gradient slope. Similarly, having more pixels in a feature requires a reduced gradient slope. The lower limit of gradient slope can be set by comparing the amplitude of the background pixel intensity with the amplitude of the peak pixel intensities of the features the algorithm is trying to find as discussed below in step 252. A smaller CCD may provide an acquired image with fewer pixels. As a result, the resolution could be lowered and processing time could be reduced as well. One drawback of a CCD that is too small is that the resolution may be insufficient to distinguish image details from non-cell objects or "noise" in the image.

An example of an effective imaging setup that provides consistent results when used with the algorithms described herein includes a microscope with a 20× objective to provide a total magnification of 200× and setting the CCD to acquire images having a resolution of 1280×960 pixels. This image resolution provides a sufficient number of pixels for the algorithm to successfully find the intended features consistently, but while minimizing processing time.

Method

In one embodiment, a fertilization test method 400 is used to analyze sea urchin eggs for the presence of a fertilization membrane and count the number of fertilized eggs among the total number of eggs in a sample. Method 400 is used, for example, to determine the percentage of fertilized eggs in a sample containing eggs of the green sea urchin found near Boston, the purple sea urchin found in North Carolina and Florida, or the sand dollar. Embodiments of method 400 are described with reference to an algorithm written in MATLAB® programming language and using at least some MATLAB® commands. With some modifications, however, other programming languages or analysis tools could be used to perform the steps of method 400 and its various embodiments.

Figure 3:
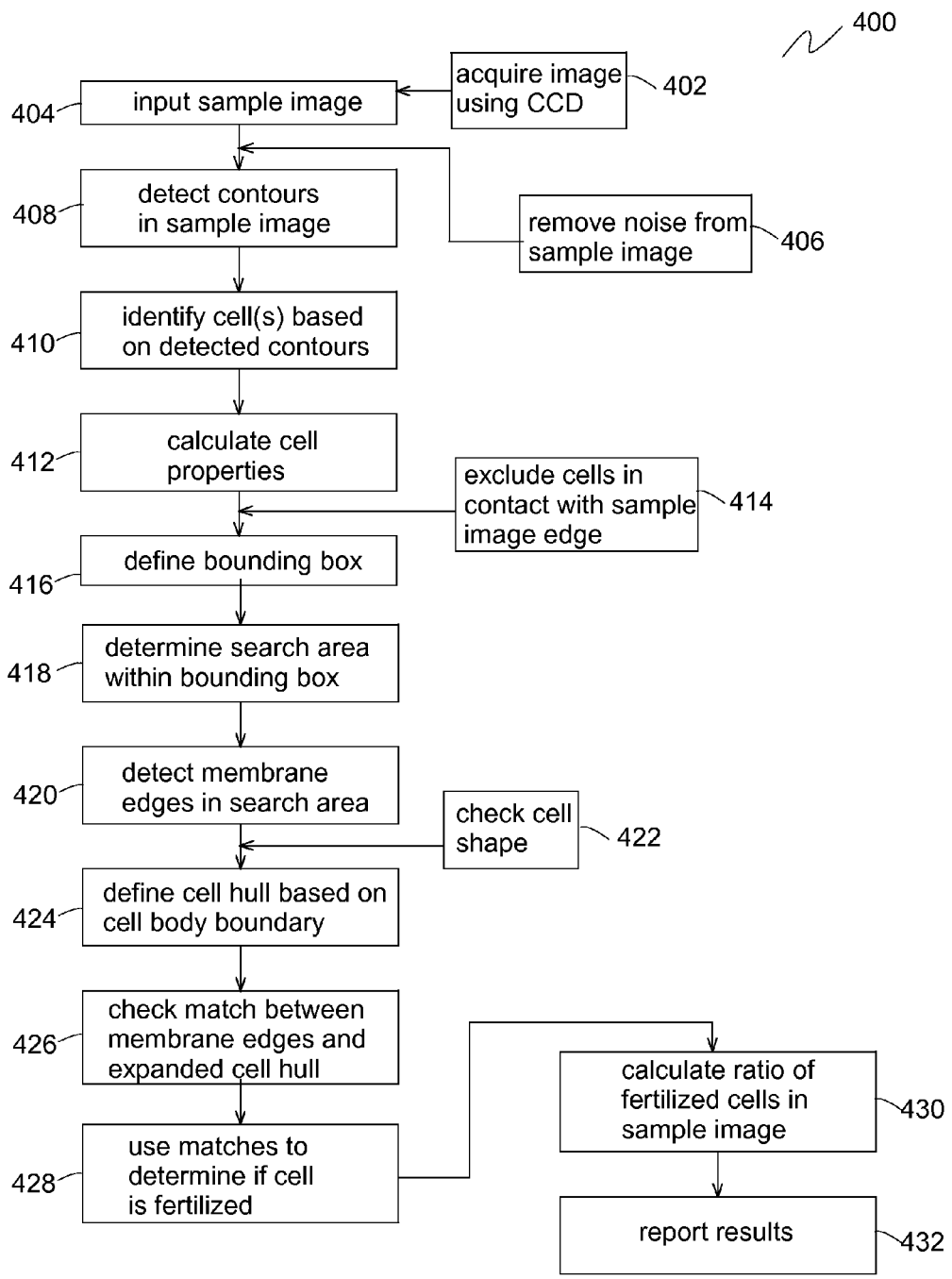
FIG. 3 is a flow diagram illustrating steps of one embodiment of a fertilization method of the present invention.

Referring now to FIG. 3, a flowchart illustrates in one embodiment of a fertilization test method 400 utilizing some or all of algorithms that will be discussed below with reference to FIGS. 4-18. In step 402, a sample image is acquired using a CCD as described in step 114, for example. In one embodiment of method 400, an apparatus as described above with reference to FIG. 1 or 2 is used to acquire the sample image. If the acquired sample image is an RGB image, method 400 converts the sample image to a grayscale image as described below in step 120, for example. In other embodiments, acquiring an image is not necessary because a sample image has already been acquired and supplied or made available to the user of method 400. In step 404, method 400 inputs the sample image to a computer or image processor configured to perform calculations and operations on an image having a plurality of pixels. In one embodiment, the image input to method 400 is a grayscale image having dimensions of 1280×960 pixels.

In step 406, noise pixels are preferably removed from the sample image by dilating and eroding pixels as described below in noise algorithm 150 and with reference to FIG. 8. In step 408, contours are detected in the sample image by finding changes in pixel intensity in the sample image as described below in segmentation marker algorithm 170 with reference to FIG. 9. In step 410, cells and cell boundaries are identified based on detected contours as described below in segmentation algorithm 200 with reference to FIG. 10. In one embodiment, markers are used to record the location of cells in a binary array of the sample image. In step 412, cell properties are calculated for each cell body located in the sample image. Cell properties may be calculated using cell properties algorithm 220 as described below with reference to FIG. 11. Properties include, but are not limited to location of cell body in the sample image, size or area of a cell body, a cell body radius, a cell body diameter, a cell body circumference of a cell body, location of the cell body boundary in the sample image, the major diameter of an ellipse inscribing the cell body, the minor diameter of an ellipse inscribing the cell body, the location of a cell body centroid (center of mass) in the sample image, a bounding box or region enclosing the cell, and a bounding box or region enclosing the cell and cell membrane. In step 414, cells having a pixel connected to a pixel of the sample image border are preferably excluded from analysis and/or removed from the sample image or other pixel arrays representing objects in the sample image.

In step 416, a bounding box is defined for each cell body using bounding box algorithm 280 described below with reference to FIG. 13. In step 418, a search area is determined using bounding box algorithm 280, which calculates the maximum radial distance from each cell body boundary and the number of locations to check for membrane edges. The bounding box is adjusted as needed to include the search area and to be located within the bounds of the sample image.

In step 420, the search area is checked for cell membrane edges using cell membrane algorithm 250 as described below with reference to FIG. 12. Unwanted objects and stray edges are preferably removed from the image and/or excluded from analysis as a valid cell membrane edge. In step 422, the cell body boundary is checked against a Gaussian ring for a goodness-of-fit value using a shape check algorithm 300 discussed below with reference to FIGS. 14-16. A cell failing the goodness-of-fit threshold value is preferably excluded from analysis as not being a valid cell.

Continuing from step 422, in step 424, a cell hull is defined for a selected cell using convex hull algorithm 320 described below with reference to FIG. 17. In other embodiments of method 400, a cell outline is defined, where the cell outline is preferably the cell hull, but may also be defined by the cell body boundary or a plurality of points that make up the cell body boundary or cell hull. In step 426, the cell hull (or cell outline) is preferably expanded radially in increments of one pixel and checked for matches with cell membrane edges detected in step 420. In step 428, matches between the cell hull and detected cell membrane edges are used to determine whether a selected cell is fertilized using fertilization algorithm 350 described below with reference to FIG. 18. In step 430, a ratio is calculated of fertilized cells to the total number of cells in the sample image. The ratio is reported in step 432, preferably by graphically displaying the sample image with indicators for each fertilized cell. Other reporting methods are also acceptable, including text or numerical reporting, a table listing all cells in the sample image and noting which cells are fertilized, and the like. The ratio of fertilized cells to the total number of cells may be used to determine toxicity levels in the sample.

Pre-Processing

Figure 4:
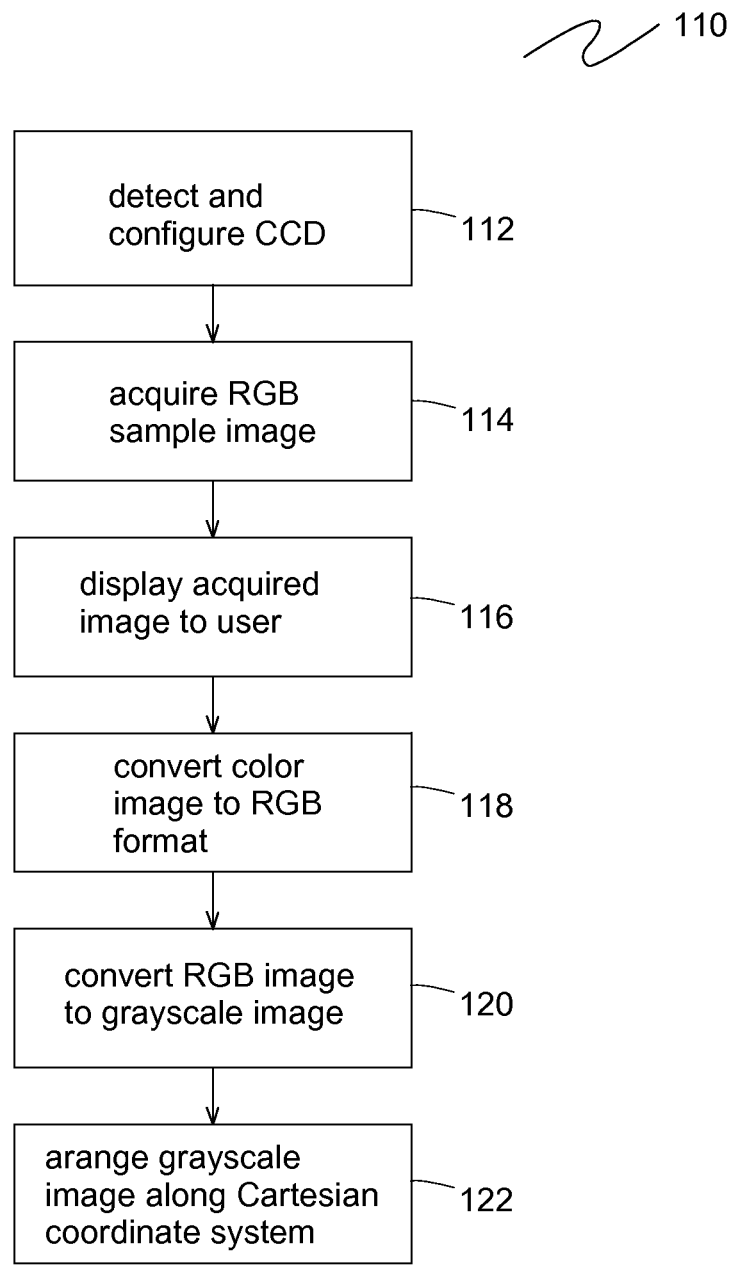
FIG. 4 is a flow diagram illustrating steps in one embodiment of pre-processing algorithm of a method of the present invention.

Referring now to FIG. 4, a flowchart illustrates steps performed in one embodiment of a preprocessing portion 110 of one embodiment of a fertilization test method 400. In step 112, a CCD is detected and configured to acquire an image having a specified size and color space or color model. The captured image in one embodiment represents an area of 0.366 mm×0.274 mm and has a resolution of 1280×960 pixels. Thus, each pixel represents a square region having sides of about 0.28 μm in length.

Color space may be, for example, RGB or Y'UV color space. In one embodiment, the CCD uses a YUY2 color space, which is a member of the Y'UV (luma and two chrominance) color space family. The following equations are used to convert the YUY2 image to a RGB image (red-green-blue):

$$R=(298*(Y'-16)+409*(V-128)+128)/256 \tag{1}$$

$$G=(298*(Y'-16)-100*(U-128)-208*(V-128)+128)/256 \tag{2}$$

$$B=(298*(Y'-16)+516*(U-128)+128)/256 \tag{3}$$

In the above equations, Y' is the brightness value (luma) for the black and white component of the image. U and V are the chrominance (color) components of the image. Luminance is denoted by Y and luma by Y'—the prime symbols (') denote gamma compression. To differentiate these terms, "luminance" refers to perceptual brightness (color science), while "luma" refers to electronic brightness (e.g., display voltage). In one embodiment, preprocessing portion 110 acquires an RGB image. In another embodiment, preprocessing portion 110 acquires a grayscale image.

In step 114, preprocessing portion 110 acquires a sample image, preferably having an RGB color space. The acquired image may be an RGB-encoded image. The use of RGB as an input color space is not unique, but the built-in MATLAB tools for creating a grayscale image work only with RGB images. The grayscale conversion supplied by MATLAB removes the chrominance component of the image while keeping the luma component. In step 116, preprocessing portion 110 optionally displays the acquired sample image to the user on a screen or other imaging device. Step 116 allows the user to visually confirm that a sample image showing eggs has been acquired and that the image appears adequate for processing. Step 116 is not required and may be performed at any stage of analysis to show image analysis steps to the user.

If the acquired color sample image is not an RGB image, in step 118 acquired color images are converted to RGB format. In step 120, an RGB image is converted to a grayscale image. In MATLAB, converting the RGB image to grayscale is accomplished by the command I=rgb2gray(RGB).

In embodiments where method 400 is performed in a MATLAB environment, the available image processing tools operate most effectively on a grayscale image. A grayscale digital image is an image in which the value of each pixel represents only intensity information. Grayscale images are composed exclusively of shades of gray that vary from black at the lowest intensity (value of 0) to white at the highest intensity (value of 255). Other embodiments of the method operate on RGB images or images having some other color space or color model.

In step 122, the sample image is arranged along a standard Cartesian coordinate system with the y-axis as the vertical axis or ordinate and the x-axis as the horizontal axis or abscissa. Preferably, the origin (0, 0) is located at the upper left corner of the image. The image may alternately be arranged differently in the Cartesian coordinate system or using other coordinate systems altogether.

Morphological Operations Algorithm

In a MATLAB environment, structuring elements are used to perform morphological operations on a sample image. Equivalent elements or processing tools could similarly be used in other embodiments of the invention configured to perform in a different computing environment. The structuring elements described below are calculations and image operations performed in a MATLAB environment.

Figures 5, 6:
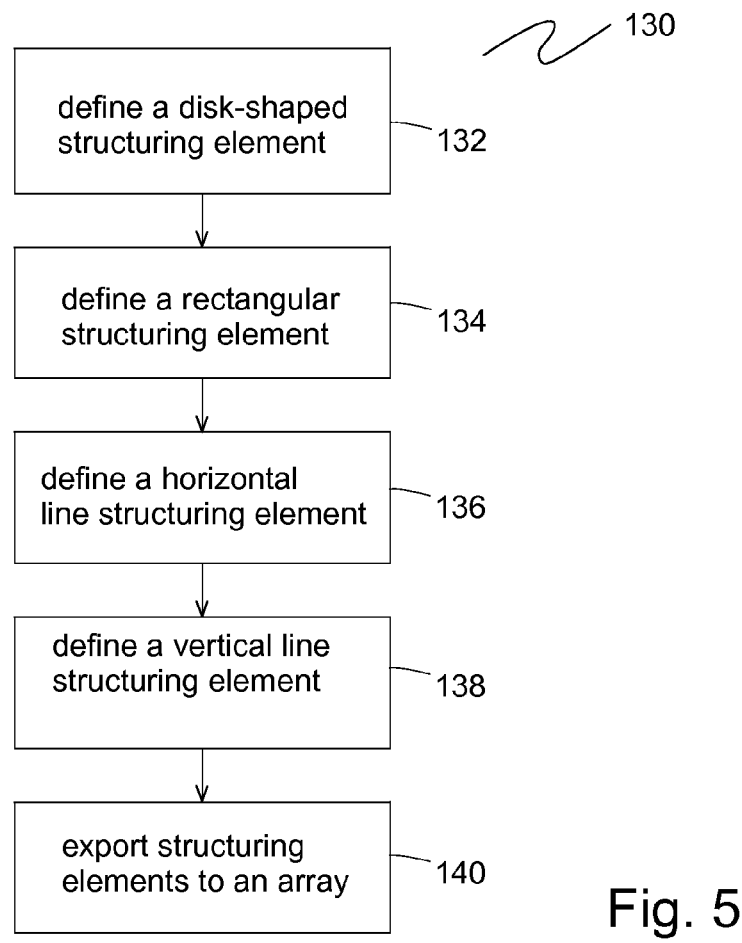
FIG. 5 is a flow diagram illustrating one embodiment steps performed to define binary structuring elements of the present invention.
FIG. 6 is an exemplary disk-shaped structuring element created using the algorithm of FIG. 5.

Referring to FIG. 5, a flow chart illustrates steps performed in one embodiment of a morphological operations algorithm 130. Morphological operations algorithm 130 does not require any input information and it creates or defines at least one flat (2D) binary structuring element for performing morphological operations on a grayscale image. Morphological operations include expanding or contracting parts of a grayscale image. In MATLAB, morphological operations algorithm 130 uses the command ele=bs_analysis_elements. Morphological operations algorithm 130 is further detailed in steps 132-140, below.

In step 132, a flat (2D) disk-shaped binary structuring element is defined or created. The structuring element is a matrix composed of ones and zeros. Disk-shaped structuring element is a rectangular array containing ones in the shape of a circle or disk. Disk-shaped structuring element preferably has a diameter of nine pixels as illustrated in FIG. 6. FIG. 6 illustrates an example of a disk-shaped structuring element 36 expressed with ones and zeros and having a diameter of nine pixels.

A disk-shaped structuring element is used because the shape of the structure used to probe the image affects the information returned when the structuring element is used to alter the morphology of objects in the image. Because sea urchin eggs are round objects, it is appropriate to use a circular or disk-shaped structuring element. The size of the structuring element is determined by the level of detail needed by the algorithm to probe the image. The algorithm does not need detailed information, just the general shape. MATLAB uses the command disk_ele=strel('disk',20).

In step 134, a rectangular structuring element is created or defined. Rectangular structuring element preferably is a 5×5 pixel square of ones. The rectangular structuring element is used in segmentation marker algorithm 170, for example, to close objects in an image by removing gaps and holes. For example, an empty space having an area of less than ten pixels and surrounded by connected pixels, a rectangular structuring element is used to fill the empty space. The process of removing these holes or empty spaces will be explained below with segmentation marker algorithm 170. MATLAB uses the command ele.box_ele=strel(ones(5,5)).

In step 136, a horizontal line structuring element is created. Linear structuring elements will be used in the edge detection section of the algorithm to morphologically dilate or expand specific edges found in the grayscale image. The effect of dilation is that pixels on the edge of an object are expanded, preferably by a dilation amount of five pixels. Other values for the dilation amount are also acceptable, but the dilation amount of five pixels was chosen after experimentation as the preferred amount of dilation for an image having 1280×960 pixels. A dilation amount of five pixels is a balance between the desired effect of connecting broken edges and the undesired effect of merging together two edges.

Figure 7:
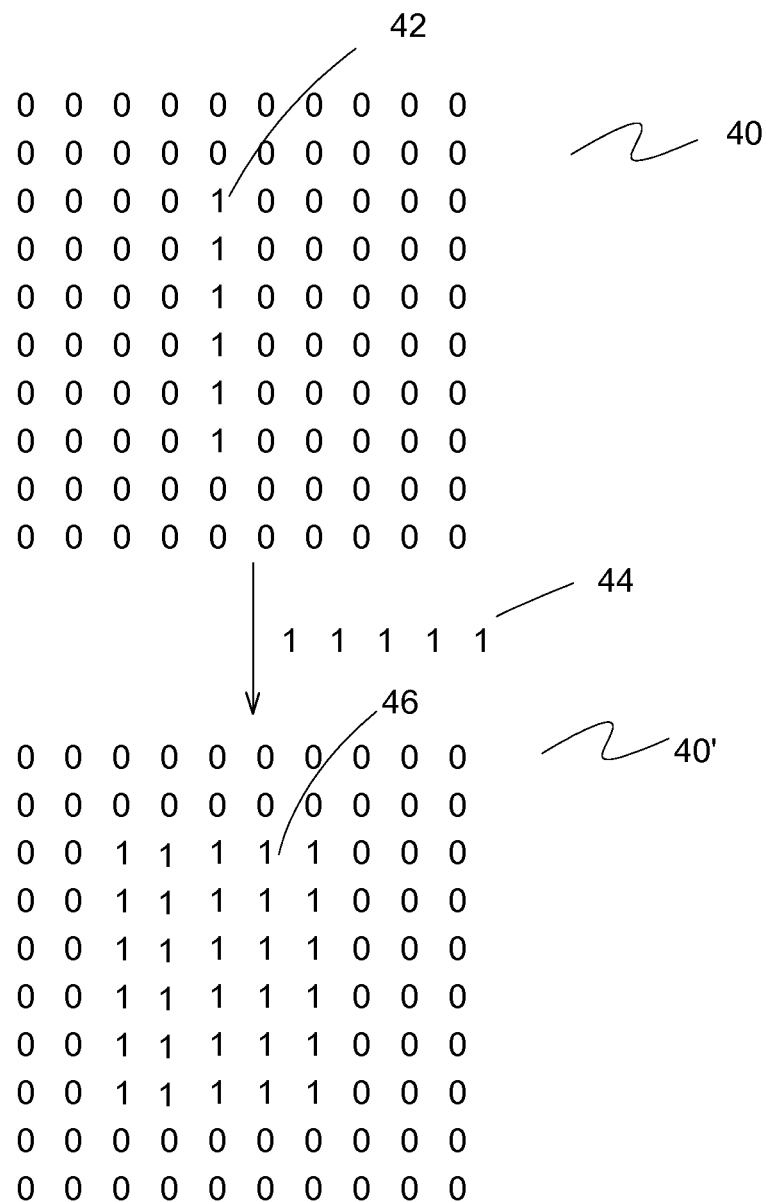
FIG. 7 illustrates an example of a binary image operation using a structuring element defined in the algorithm of FIG. 5.

When using the horizontal line structuring element, expansion occurs only in the X-axis direction. FIG. 7 shows a pixel array 40 with an edge 42 represented by six ones positioned adjacent one another in the Y-axis (vertical) direction. The algorithm in this example creates a horizontal line structuring element 44 having a row of five ones positioned adjacent one another in the X-axis (horizontal) direction. By applying horizontal line structuring element 44 to the pixels of edge 42, edge 42 having a one-pixel width is expanded in the X-axis direction to yield a dilated edge 46 with a five-pixel width in array 40'. Horizontal line structuring element 44 is used during edge detection to dilate (or expand) edges horizontally by two pixels to the left and two pixels to the right of a center pixel.

Referring again to FIG. 5, in step 138 a vertical line structuring element is defined or created. Similar to the horizontal line structuring element in step 136, the vertical line structuring element acts on edges found in the grayscale image to morphologically dilate the edges in the Y-axis-direction. The vertical line structuring element is preferably five pixels in size. The dilation similarly expands edges to 5 pixels along the Y-axis. MATLAB uses the command ele.se_h=strel ('line',5,0).

In step 140, each structuring element is written to an array known as a structure in MATLAB. The structure is exported for use by method 400. The structure contains morphological structuring elements, such as ellipses (including circles), rectangles (including squares), and lines (vertical and horizontal). This structure is not to be confused with the structuring element discussed in steps 132-138. Step 140 completes structuring element portion 130. MATLAB uses the command ele.se_v=strel('line',5,90).

Noise Algorithm

Figure 8:
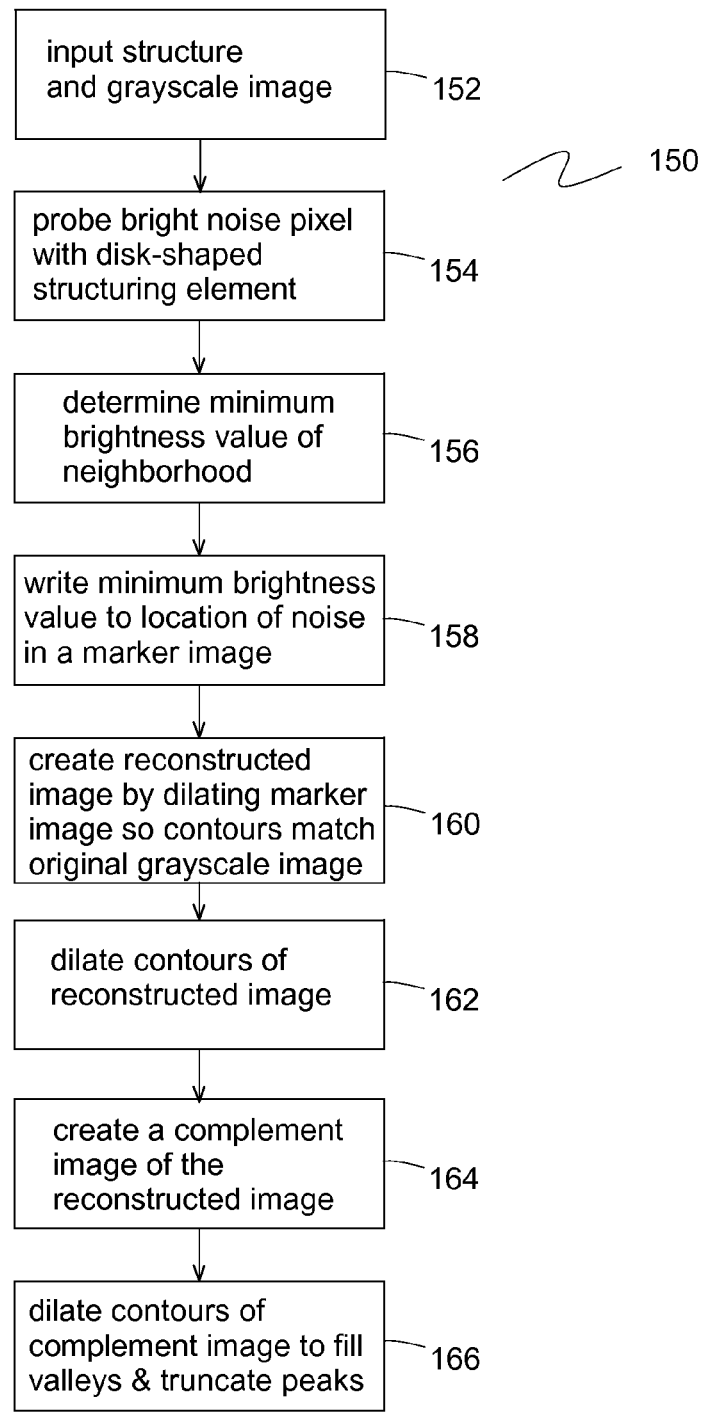
FIG. 8 is a flow diagram illustrating steps in one embodiment of a noise algorithm of the present invention.

Referring to FIG. 8, a flowchart illustrates steps performed in one embodiment of a noise algorithm 150. Noise removal algorithm is not required, but is preferred for best results. In step 152, noise algorithm 150 receives or inputs the original grayscale image and the structure containing morphological structuring elements.

In steps 154-158, the grayscale image is morphologically eroded using the disk structuring element. Erosion removes small groups of bright pixels, or "noise pixels" from the grayscale image. For a 1280×960 pixel image described above, a group of noise pixels typically has an area of less than 100 pixels. In some instances, groups of noise pixels have an area of only 5-6 pixels or an area of up to 1500 pixels are present in the sample image and may represent contaminants in the sample. For this size and resolution of image, the area for groups of noise pixels contrasts a typical cell having an area of about 50,000-100,000 pixels.

In step 154, a bright noise pixel is probed by centering a disk-shaped structuring element with a diameter of nine pixels on a bright pixel and examining the brightness of neighboring pixels or "neighborhood." A bright pixel is any pixel that is the brightest pixel (i.e., has the greatest intensity value) of any pixel in the neighborhood. In one embodiment, the neighborhood is the pixel being examined plus the eight pixels forming a square that immediately surrounds the pixel being examined and that would have a positive value when multiplied by the disk-shaped structuring element. In another embodiment, the neighborhood includes a larger radius of pixels that surround a bright noise pixel. In step 156, the neighborhood pixels are examined to find the minimum non-zero brightness value. Black pixels (those having a brightness value of zero) are not considered for the minimum brightness value. The neighborhood in one embodiment includes the eight pixels immediately surrounding a pixel being examined, but may be adjusted to include more pixels.

In step 158, this minimum brightness value is saved or written into a new array, the marker image I_e, at the same location as the pixel being probed. The marker image I_e is an eroded version of the original grayscale image. By assigning the minimum brightness values to noise pixels, the marker image I_e now has less noise. With noise omitted from the grayscale image, cell bodies can be found more reliably. MATLAB uses the command I_e=imerode(I,ele.disk_ele).

In step 160, the algorithm creates a reconstructed image I_obr using the eroded marker image and the original grayscale image (a.k.a. the mask image). The reconstructed image I_obr is made by repeatedly performing a morphological dilation on the marker image until the contours of objects or regions in the marker image match the contours in the original grayscale image. In the resulting reconstructed image I_obr, objects have the same shape as is the original grayscale image, but without noise. The noise does not return because of the way that dilation works. Dilation is similar to erosion, but instead of taking the neighborhood brightness minimum as is done with erosion, dilation uses the neighborhood brightness maximum to dilate a pixel. Thus, the reconstructed image lacks the noise in the original image, yet objects in the image still have the same shape. Maintaining an object's shape is important because a change in an object's shape might lead to errors in feature identification. MATLAB uses the command I_obr=imreconstruct(I_e,I).

In step 162, the algorithm uses the rectangular structuring element to dilate the reconstructed image created in step 160. The purpose for performing this dilation is to start removing dark noise in the image, unlike steps 154-158 described above in which bright noise was removed by eroding the image. MATLAB uses the command I_obrd=imdilate(I_obr,ele.disk_ele).

In step 162 the algorithm removes dark noise from an image from which bright noise has already been removed. The way that the dark noise is removed from the eroded image is by using the image reconstruct function in MATLAB. As described in step 160, the reconstruct function performs multiple dilations until the contours in the maker image match the contours in the mask image. In the resulting dilated reconstructed image I_obrd, the marker image previously was the same as the mask image in areas of dark noise.

In step 164, the marker image is transformed by creating a complement of the dilated reconstructed image I_obrd created in step 162. To create a complement image of the dilated reconstructed image, a pixel having a brightness value of 255 is changed to having a brightness value of 0; a pixel having a brightness value of 0 is changed to having a brightness value of 255. Brightness values from 1-255 are similarly exchanged between 1 and 254, 2 and 253, 3 and 252, 4 and 251, and so on. The result is a complement image I_obrcbr where peaks of the dilated reconstructed image are now valleys in the complement image I_obrcbr and valleys of the dilated reconstructed image are now peaks in the complement image I_obrcbr.

In step 166, contours of the complement image I_obrcbr of step 164 are dilated using the rectangular structuring element. The valleys in the complement image will be filled in as the contours of the marker image are dilated. At the same time, peaks in the marker image that are larger than the mask image are truncated to match peaks in the mask image due to dilation of the contour pixels. The result of the reconstruction is an image that has neither dark nor bright noise in it. This reconstructed image is ideal to use for finding the large objects of interest in the image (e.g., cell bodies). MATLAB uses the command I_obrcbr=imreconstruct(imcomplement(I_obrd), I_obr)).

Segmentation Markers Algorithm

Figure 9:
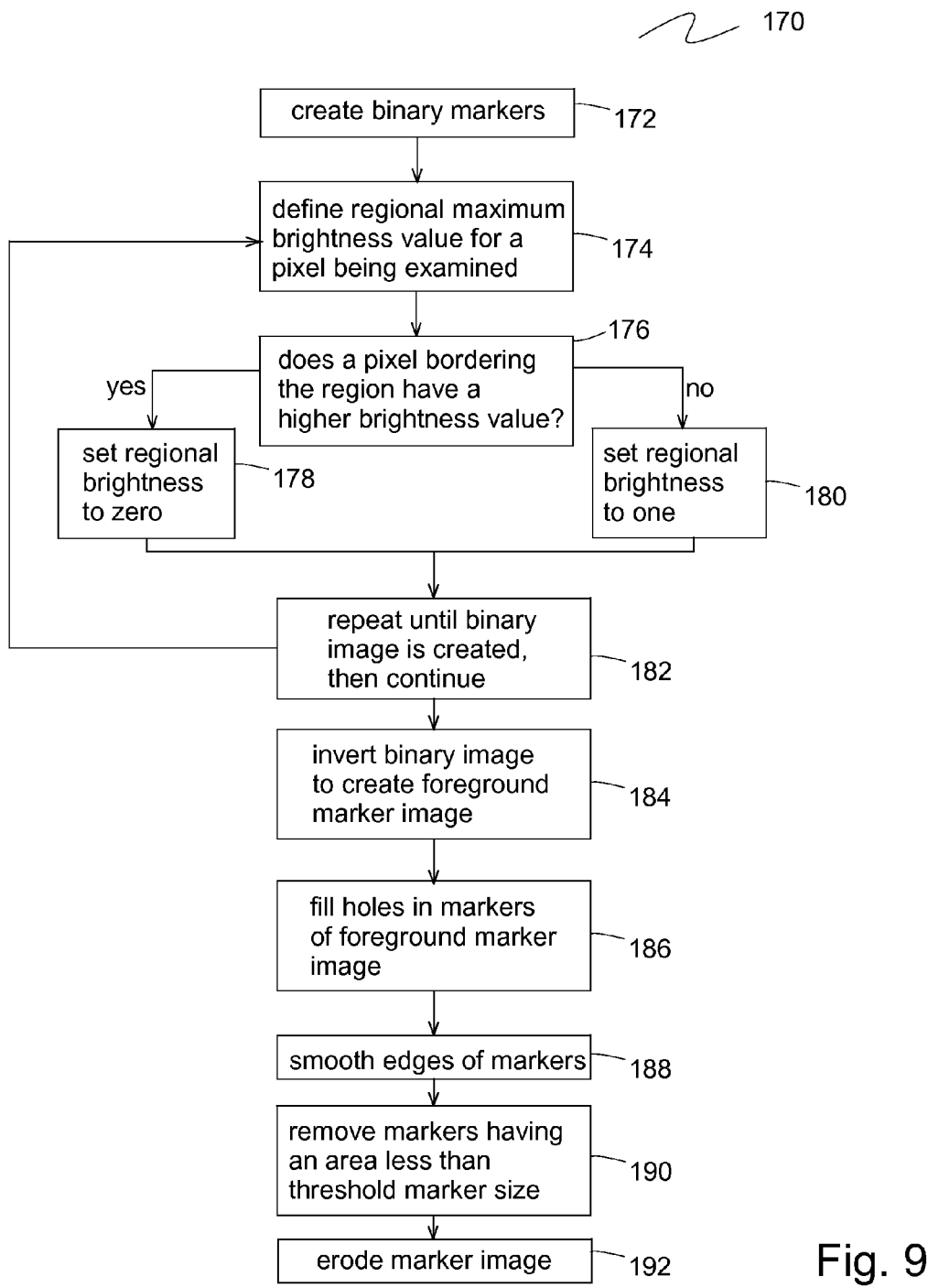
FIG. 9 is a flow diagram illustrating steps of one embodiment of a segmentation marker algorithm of the present invention.

After noise algorithm 150 has removed bright and dark noise from the grayscale image, segmentation markers algorithm 170 dynamically separates the grayscale image into foreground markers and background. Steps of one embodiment of segmentation markers algorithm 170 is illustrated in FIG. 9. The images from algorithm 170 are used for finding cell bodies within the image.

Segmentation markers algorithm 170 is based on a MATLAB algorithm that begins in step 172 by creating binary markers that will be used to identify cell bodies. This is different from the marker image discussed above. The created markers are used to find areas that are regional brightness maximums in the brightness complement image I_obrcbr created in step 164. In step 174, a regional brightness maximum is defined as a group of pixels that have the same brightness value as the pixel being examined and that also share an edge or corner of the pixel being examined. This connectivity can be repeated to extend from the pixel being examined as long the brightness is the same as the pixel being examined. This step usually defines a large area of continuously connected pixels that have the same brightness values.

In step 176, pixels bordering the connected area are examined to determine whether any of the bordering pixels are brighter than the connected pixels. If a brighter pixel is found along the border of the group of connected pixels, then the connected pixel area is set to a brightness value of zero in step 178. If no brighter pixels are found along the border of the connected pixels, then the connected area is set to a brightness value of one in step 180. In step 182, this process is repeated until a binary array is formed where the binary array has the same pixel dimensions as the original grayscale image array. This new binary array has a value of one at the regional maximums and zeros elsewhere.

In step 184, the binary image from step 182 is inverted by changing the values of ones to zeros and zeros to ones. This inversion is done so that holes in the markers can be filled in during step 186. The resulting inverted image is named foreground marker image foreground_m and has markers defined by connected regions of ones. A hole is defined as an area of connected zeros surrounded by a continuous border of ones. MATLAB uses the command forground_m=~imregionalmax(I_obrcbr).

In step 186, holes are filled that are inside the markers in the foreground marker image foreground_m from step 184. The markers may have developed holes inside of them after step 184. Holes may result from surviving inhomogeneity in the image that are not removed during previous steps. The MATLAB filling function works by finding areas of zeros that are connected and have a continuous border of ones. If holes are found, the zeros making up the hole are replaced with ones. A new marker array, foreground marker image 2, is then placed in foreground_m2 marker array. The filling is necessary to prevent errors in the image segmentation steps which follow later. MATLAB uses the command foreground_m2=imfill (foreground_m,'holes').

In step 188, edges are smoothed of markers in foreground_m2. To smooth the marker edges, the rectangular structuring element is first used to dilate the foreground_m2 marker array. The dilation also closes small gaps (e.g., less than about 10 pixels) along the edge of the marker array. The dilation is then eroded with the box structuring element. The result is that small gaps that have been closed will remain closed but the gaps are now smoothed as a result of the erosion process. The result of edge smoothing is markers having smooth edges. This will facilitate image segmentation in the later steps. Edge smoothing also removes any artificial cell segmentation that resulted from previous image processing in steps 172-186. Having edges smoothed, foreground marker image 3 is placed in foreground_m3 marker array. MATLAB uses the command foreground_m3=imclose(foreground_m2, ele.box_ele).

In step 190, algorithm 170 finishes creating foreground markers by removing all connected pixels in foreground_m3 that have a total pixel area less than a threshold marker size of 1500 pixels (about 3% of the minimum cell size or 1 pexel per about 820 sample image pixels). Other threshold marker size values are acceptable, but the value of 1500 pixels was determined by experimentation and found to be effective for a 1280×960 pixel image. This value balances effective removal of non-cell objects (sand, parts of plants, etc.) while keeping small cells (e.g., about 50,000 pixels). MATLAB uses the command fgm=bwareaopen(forground_m3,1500).

In step 192, algorithm 170 erodes foreground_m3 (with markers removed below threshold marker value) from step 190 by 20 pixels, creating an eroded marker foreground image where markers are represented by ones. The eroded marker foreground image is used in the image segmentation later in the algorithm to prevent over-segmentation during the marker segmentation process, which is explained below in cell segmentation algorithm 200. MATLAB uses the commands fgm_s=fgm; fgm_s=imerode(fgm_s,disk_ele).

Cell Segmentation Algorithm

Figure 10:
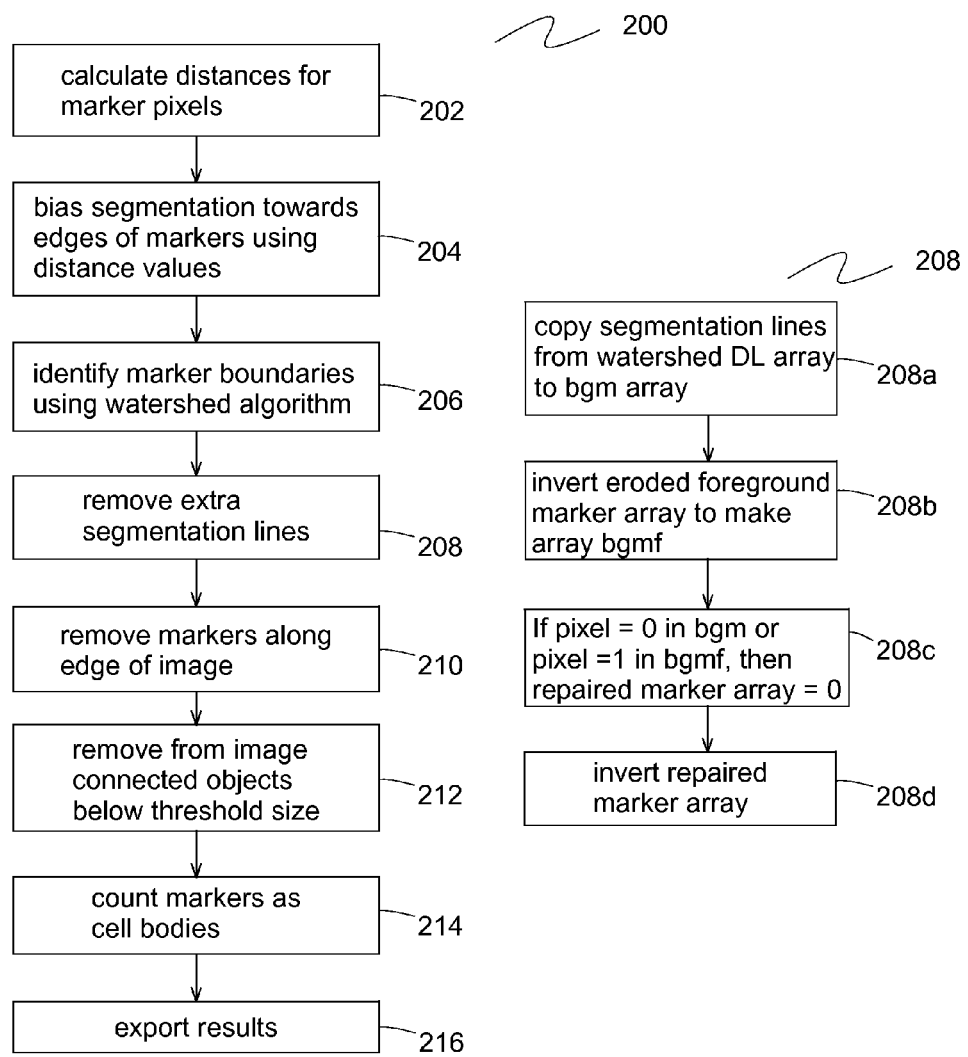
FIG. 10 is a flow diagram illustrating steps of a cell segmentation algorithm of the present invention and showing steps comprising one algorithm step.

Referring to FIG. 10, a flow chart illustrates steps performed in one embodiment of a cell segmentation algorithm 200. Cell segmentation algorithm 200 finds and exports cell body boundaries to a 2D array. The cell body boundaries are expressed as ones and zeros in the 2D array and represent contiguous regions enclosed by the cell body boundaries in the grayscale image (i.e., cell bodies). The exported array is a binary image built from the grayscale image and a grayscale image having small groups of bright pixels removed.

In step 202, the algorithm prepares markers to be segmented by determining whether a pixel is part of an object or part of the background. In order to segment markers that might have been merged due to the earlier morphological functions, a distance calculation is required. This distance D is calculated from one pixel inside the marker (x1, y1) to the nearest non-zero pixel (x2, y2) using a Euclidean distance measurement. The Euclidean distance measurement calculates the distance using the following equation:

$$D = \sqrt{(x_1 - x_2)^2 + (y_1 - y_2)^2} \quad (4)$$

To rapidly calculate these distances, MATLAB uses a method described by Calvin Maurer, Renshing Qi, and Vijay Raghavan, *Linear Time Algorithm For Computing Exact Euclidean Distance Transforms of Binary Images in Arbitrary Dimensions*, IEEE Transactions on Pattern Analysis and Machine Intelligence, Vol. 25, No. 2, April, 1993, pp. 176-201 (incorporated herein by reference). The distances are assigned to a distance array D. A complement distance array Dc is calculated from the distance array D to bias the segmentation towards making the splits along the outer edge of the markers. Complement distance is the negative value of distance in distance array D. MATLAB uses the commands D=bwdist(~fgm); Dc=−D.

In step 204, algorithm 200 makes markers easier to segment. To make complement distance array Dc easier to segment, the longest negative distance must become equal to zero so that markers are split along a shared boundary. As a result, the shortest distance, zero, will becomes the longest distance. All distances between the longest and shortest distances are also modified to bias segmentation even more towards the edge of markers. MATLAB uses the command Dc=Dc+abs(min(min(Dc))).

A mask is used to further bias the segmentation towards the edges of markers. To bias the segmentation towards the edges of the markers, the markers of eroded foreground marker image 3 from step 192 are used as a mask, foreground marker mask, to select the distances to be modified. Distances are selected by applying the logic AND operator to the values in Dc and foreground marker mask. If foreground marker mask has a value of one and the complement distance array Dc has any value, then that location is selected to be modified. The modification performed is to set the current complement distance value at that location to zero. The resulting Dc array has markers with a center set to zero, a ring of non-zero values, and surrounding media where the distance is the maximum value. This results in markers that will be segmented only along the edges of the markers, and preventing over segmentation of the markers. MATLAB uses the command Dc(fgm_s)=0.

In step 206, markers are segmented by applying a watershed algorithm to identify marker boundaries in the Dc array resulting from step 204, above. Segmentation algorithm 200 uses a watershed algorithm to "flood" the array or image. The array of distance values can be thought of as a landscape having higher and lower terrain as indicated by the distance value. The flood starts at the lowest point in the image, which is represented by the shortest distance, zero. The watershed algorithm proceeds to sequentially flood pixels of increasing distances. It begins by flooding distance values in the array having a value of 0, then 1, then 2, and so on. When two or more flooded areas meet, a boundary or segmentation line is formed. Segmentation lines or boundaries are recorded in a watershed array DL. These boundaries segment the markers. MATLAB uses the command DL=watershed(Dc).

In step 208, marker segmentation is repaired if needed to remove extra segmentation lines. Step 208 is performed to obtain an accurate count of cells in the image. At the end of step 208, segmentation lines in the repaired binary background marker array will have a value of one, where everything else has a value of zero. Because segmentation step 206 is not perfect, markers are often over-segmented as a result of distance values in the Dc array that are not radially symmetric. For example, if a group of distances separates two other pools of distances, then, as the flood waters increase, a segmentation line will form where it is not wanted.

Removing extra segmentation lines can be broken down into multiple steps. In step 208a, the segmentation lines (indicated by zeros) in the binary watershed array DL are copied to a new binary background marker array bgm where the segmentation lines are indicated by ones. MATLAB uses the command bgm=DL==0.

The second part of step 208 is to finish removing the extra segmentation lines and to be sure that the markers indicate all the cell bodies, including cell bodies located next to each other. In step 208b, values in eroded foreground marker image from step 192 are first inverted, so ones become zeros, and zeros become ones. The result of step 208b is array bgmf in which markers previously indicated by ones are now indicated by zeros.

In step 208c, the logic OR operator is then applied to the inverted eroded foreground marker image array bgmf of step 208b and the new background marker array bgm from step 208a.

In step 208c, the logic OR operator is applied to the inverted eroded marker foreground array bgmf step 208c and array bgm containing a copy of segmentation lines from watershed array DL, where segmentation lines also have values of 1. Thus, a pixel in the resulting repaired marker array will have if a value of 1 if a corresponding pixel in either the inverted eroded marker foreground array bgmf has a value of 1 or a corresponding pixel in array bgm has a value of 1. The result of the logical OR operation is an array containing segmentation lines that segment the markers, where no segmentation lines extend outside of those markers. In step 208d, this resulting repaired segmentation array next has its binary values inverted from 1 to 0 and 0 to 1. This inverted repaired segmentation array is a binary cell bodies marker array bw where markers have values of 1. Some segmentation within the markers of binary cell bodies marker array bw are indicated by zero values. MATLAB uses the command bw=~(bgm|~fgm).

In step 210, markers along the edge of the marker array bw are removed. The black and white marker array bw might have some markers along the edge which need to be removed. These markers along the edge of the array will cause problems when the algorithm counts the number of cell bodies. MATLAB has a built in clear border function imclearborder that will remove these offending markers along the border of an image. The clear border algorithm works by checking for any non-zero pixel connected to any other non-zero pixel that is also connected to an edge of the image array. If that pixel is connected to an edge, it is removed by setting its value to zero. This gives a new binary marker array bw without any markers that touch the edges of the array. MATLAB uses the command bw=imclearborder(bw, 4).

In step 212, small parts of cells or other objects remaining after segmentation are removed from the image. The removal is done with the same function used to remove small markers in step 190. In step 212, the preferred threshold size of connected objects to be removed is 1000 pixels. This threshold size was arrived at by experimentation and chosen as the size that effectively removes small over-segmented parts of cells from the marker array bw. With the small parts removed, the marker array bw is ready for cell body counting. MATLAB uses the command bw=bwareaopen(bw,1000).

In step 214, the markers in the marker array bw from step 212 are counted as cell bodies. To count the markers as cell bodies, MATLAB has a built in function known as bwboundaries that labels (L) and traces (B) the binary markers. The number of traces gives the cell count. This MATLAB function labels and traces the binary markers by following the connected edge of a marker. While this function would normally trace both the edges on the outside of the marker as well as the inside of the marker, selecting the option 'noholes' results in the function ignoring all holes inside the marker. After tracing a specific marker edge or boundary (B), the traced boundary is labeled (L) with a unique number. MATLAB uses the command [B,L]=bwboundaries(bw,'noholes').

In step 216 variables B, L, bw, and I_obr are exported out of algorithm 200 for further use by method 400. These variables will be used in finding the membrane edges and also for other tasks. When exported out of algorithm 200, the L→I.L, bw→I.bw and I_obr→I.obr will be added to the I structure array, while the borders array B will remain an array.

Cell Properties Algorithm

Figure 11:
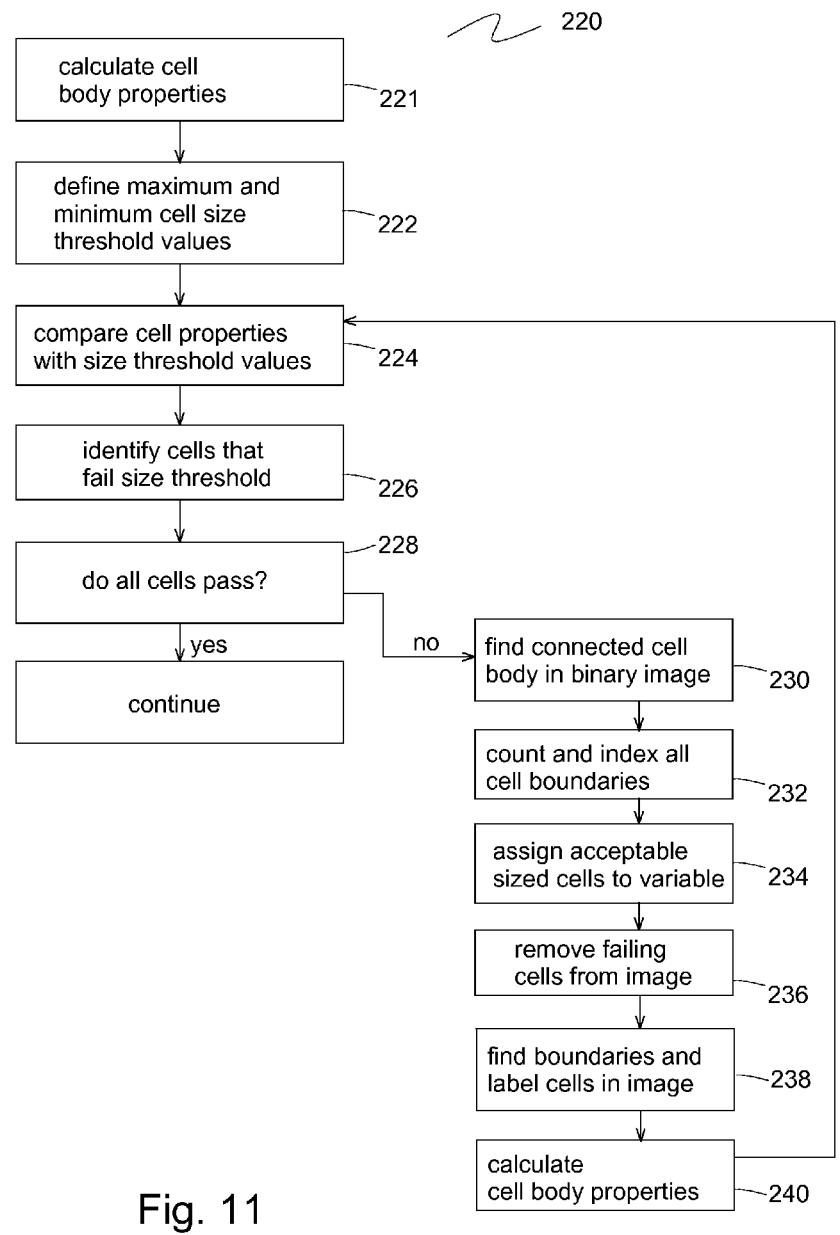
FIG. 11 is a flow diagram illustrating steps of one embodiment of a cell properties algorithm of the present invention.

Referring to FIG. 11, a flow chart illustrates steps in one embodiment of a cell properties algorithm 220 that determines properties of cell bodies and checks the size of cell bodies in borders array B. In step 221, properties of cell bodies are calculated using a built-in MATLAB function. Calculated properties for a cell body include the size and location of a bounding box that surrounds the cell body, the area of the cell body, the location of the center of mass of the cell body, and the major and minor axis lengths of a parabola inscribing the cell body. These properties for each of the cell bodies are stored in structure array obj. MATLAB uses the command obj=regionprops([I.L], 'BoundingBox', 'Area', 'Centroid', 'MajorAxisLength', 'MinorAxisLength').

In step 222, the acceptable threshold values for the smallest and largest cell areas are defined if threshold values are not already available. Threshold values can be input by a user or referenced from values stored in a database, for example. In one embodiment of method 400, size threshold values are used in the next step to remove cells that are considered questionable under Environmental Protection Agency ("EPA") recommendations for the chronic toxicity test for the sea urchin (*Arbacia punctulata*). Cells that are too large might be cells that have developed too far along the development cycle. Cells that are too small might not be cells at all, but often are cells that have exploded or failed in some manner. The EPA test does not count these cells, so it is best to remove them from the count. In one embodiment using an image size of 1280×960 pixels, the threshold values for areas of the smallest and largest cells to be counted are 50,000 pixels and 100,000 pixels, respectively. Cells having a size outside of this range are not counted. MATLAB uses the commands area_threshold_s=50e3; area_threshold_l=100e3.

In 224, the sizes of all cells are checked to determine whether they are within the acceptable size range. For each cell body having been labeled and counted in step 214, the identities or labels are recorded in a variable idx for cells that are determined to be outside of the acceptable size range. If all cells pass, then a variable idx will be empty (i.e., no value for the variable), otherwise, idx will contain the identification number of the cell(s) that failed the size check. MATLAB uses the command idx=find((([obj.Area]<area_threshold_s)|(area_threshold_l<[obj.Area])).

In step 226, a cell identified as below or above acceptable minimum and maximum size threshold values, respectively, are stored in a variable idx. In step 228, the status of idx variable is checked. If idx is empty (all cells pass size threshold check), then the IF-loop is skipped. If idx is not empty, then an IF-loop is traversed starting with step 230. MATLAB uses the command if isempty(idx)==0.

In step 230, connected components are found in the binary cell body image. MATLAB uses the command cc=bwconncomp(I.bw).

In step 232, the number of cells counted in step 214 is obtained by counting the number of boundaries in the variable B. All objects are indexed from one to the maximum number of cells and saved in all_objects variable. MATLAB uses the command all_objects=1:length(B).

In step 234, the index numbers of cells within the acceptable size range are assigned to a variable. MATLAB's setdiff command returns the index values that are in the all_objects variable but not in idx variable. These index numbers are the cells that passed the size check in step 224. MATLAB uses the command too_small=setdiff(all_objects,idx).

In step 236, the cells that did not pass the threshold are removed from the binary image. The removal is also performed by determining whether a cell that passed the threshold test is also in the connected components image. If a cell passing the size check is not in the connected components image, then that cell is also removed from the binary image. MATLAB uses the command I.bw=ismember(labelmatrix(cc), too_small).

In step 238 the boundaries are traced again in the new image and labeled as was performed in step 214. MATLAB uses the command [B,I,L]=bwboundaries(I.bw,'noholes').

In step 240, properties of each cell are again calculated using new boundaries and label information from step 238. MATLAB uses the command obj=regionprops([I.L], 'BoundingBox','Area','Centroid','MajorAxisLength', 'MinorAxisLength').

Cell Membrane Algorithm

Figure 12:
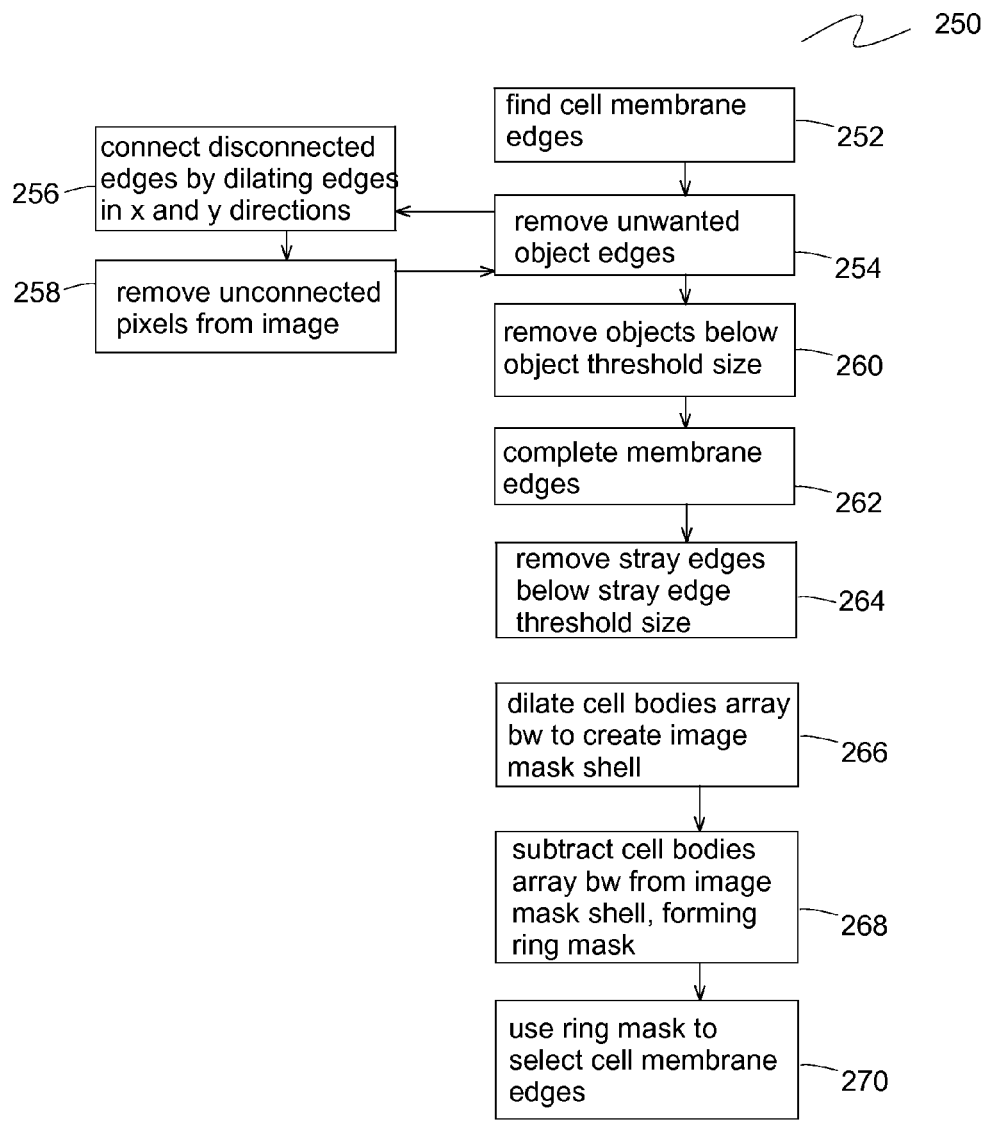
FIG. 12 is a flow diagram illustrating steps of one embodiment of a cell membrane algorithm of the present invention.

Referring to FIG. 12, a flow chart illustrates steps of one embodiment of cell membrane algorithm 250. Cell membrane algorithm 250 finds cell membranes and prepares the membranes for use in subsequent steps to determine whether a cell is fertilized. Preparing membranes includes finding and simplifying the edges of the cells membranes so that they can be used to determine the state of fertilization in a specific cell. Cell membrane algorithm 250 reads arrays I.obr→I_obr, ele, and I.bw→bw. These arrays are the grayscale reconstructed image I_obr from step 160, the structuring elements created in step 130, and the binary marker array bw of cells from step 212, respectively.

In step 252, the reconstructed image I_obr from step 160 is used to find general edges of the cell membrane. To find these edges, an edge finding function is applied to the image. In MATLAB, one such edge finding algorithm is the Canny edge finding function [9]. The Canny edge finding function operates by convolving reconstructed image I_obr from step 160 with a Gaussian kernel (array). The values that make up this kernel are created based on internal MATLAB values. The kernel, when convolved or blended with reconstructed image I_obr, results in a slightly blurred image. The blurred image is then twice convolved with the derivative of a 2D Gaussian function. The first convolution gives the pixel brightness gradient in the X-direction (Gx) and the second convolution gives the brightness gradient in the Y-direction (Gy). These x and y gradient arrays have the same size as the original grayscale image array. The two directional gradients are used to calculate the magnitude of the brightness gradient. The gradient magnitude M value is calculated from this equation:

$$M = \sqrt{|G_x|^2 + |G_y|^2} \quad (4)$$

The gradient magnitude array contains gradient magnitude values with dimensions equal to those in the original image array. The MATLAB edge detection then automatically determines the upper and lower threshold values to threshold the gradient magnitude array. The result from thresholding the gradient magnitude array is written to the I_edges array. Detected edges in the I_edges array are used to define the general outline of the membrane edges and include edges for other additional objects in the reconstructed image I_obr. MATLAB uses the command I_edges=edge(I_ob,'canny').

In one embodiment of cell membrane algorithm 250, step 252 is accomplished by steps 254 and 256. In step 254, unwanted object edges are preferably removed. In step 256 the edges are dilated to connect disconnected edges. The edge finding function does not perfectly detect all the edges in the grayscale I_obr image due to small variations in brightness between adjacent pixels. These variations result in a small value for brightness gradient magnitude. A small value for magnitude results in the threshold function rejecting that part of the edge. To account for this rejection, the algorithm dilates the detected edges. Dilating the edges also reconnects edges that might have been disconnected due to the threshold function rejecting that segment. To make sure that the only edges within the immediate area of the linear structuring elements of step 136-138 are reconnected, a two-pass process is used. On the first pass, the dilation function operates only in the y (vertical) direction. This pass reconnects the edges along the vertical axis. Next, the second pass dilates in the x direction to connect edges in the horizontal direction. In one embodiment, dilation in each of the x and y direction is five pixels, but linear structuring elements of other sizes may be used. MATLAB uses the commands I_ed_op_v=imdilate(I_edges,ele.se_v, 'same') and I_ed_op=imdilate(I_ed_op_v,ele.se_h,'same').

The edges that have not been reconnected after step 256 are edges that belong to unwanted objects that need to be removed. In step 258, unconnected pixels are removed from the image using the MATLAB command bwareaopen as described in step 190.

In step 260, objects that have an area of less than an object threshold size are removed from the image. In one embodiment, an object threshold size of 5000 connected pixels is used for acquired images of 1280×960 pixels. This size of 5000 pixels was determined experimentally and represents a value that leaves large connected edges, but removes small unwanted edges. The result from the MATLAB command is a clean edges image. The reconnected edges remaining in the clean edges image will become the fertilization membrane edges. MATLAB uses the command I_clean_edges=bwareaopen(I_ed_op,5000).

In step 262, the edges that make up the membrane are completed. The logic AND operator is applied to the clean edges image and the original edges array I_edges from step 252. The logic operation results in a binary array I_min_edges with a value of 1 in pixel locations where both arrays have a value of 1. In step 264, the I_min_edges array is processed to remove stray edges below a preferred stray edge threshold size of 20 connected pixels. The stray edge threshold size of 20 connected pixels is the preferred value as determined by experimentation in removing unconnected edges which are not part of the membrane in a 1280×960 pixel image. Other stray edge threshold values may be used so long as the detected membrane is not also removed. This value of 20 pixels is used whether the egg is fertilized or unfertilized in an image having dimensions of 1280×960 pixels. The stray edge threshold value of 20 connected pixels is sensitive to image resolution and should be adjusted consistently with images of different resolution. MATLAB uses the command I_min_edges=bwareaopen(I_clean_edges & I_edges,20).

In step 266, a binary mask named I_mask_shell is created from the binary cell bodies marker array bw from step 208. To create image mask shell, the cell bodies in binary cell bodies marker array bw are dilated twice using a disk shaped structuring element with a diameter of 9 pixels. This dilation extends the area of the binary cell bodies to include the cell membranes of fertilized eggs. This new binary mask, I_mask_shell, is the base for a mask that selects only the edges that compose the fertilization membranes. This is explained further in the next steps. MATLAB uses the commands I_mask_shell=imdilate(bw,ele.disk_ele); I_mask_shell=imdilate(I_mask_shell,ele.disk_ele).

In step 268, the circular mask is converted to a ring mask named I_ring. To create the ring mask, the original binary cell bodies array bw is logically inverted and then removed from the I_mask_shell mask with a logical AND operation. In other words, the cell bodies array bw is subtracted from image mask shell to create the ring mask I_ring. The ring mask I_ring is an array containing ones in a ring shape around the region of a cell body. The width of the ring depends on the original size of the cell, but on average, the radial width is about 37 pixels from the inner diameter of the ring to the outer diameter of the ring. This ring mask is used to select just the edges that are located around the cell bodies. MATLAB uses the command I_ring=~bw & I_mask_shell.

In step 270, the edges around the cell body are selected for speeding up the algorithm in later steps. The edges around the cell body are selected by applying a logic AND operator to select areas occupied by both the ring mask I_ring and the edges array I_min_edges from step 264. Other areas of the resulting array are removed by filling these areas with background values. This results in an array I_edge_torus containing only the membrane edges, which speeds up the algorithm. Increased speed is observed in steps that occur later in the algorithm. MATLAB uses the command I_edge_torus=I_ring & I_min_edges. The I_edge_torus array is exported out of the sub-function and added to the structure array I with a new name of I.edge_canny. MATLAB uses the command I_edge_torus→I.edge_canny.

Bounding Box Algorithm

Figure 13:
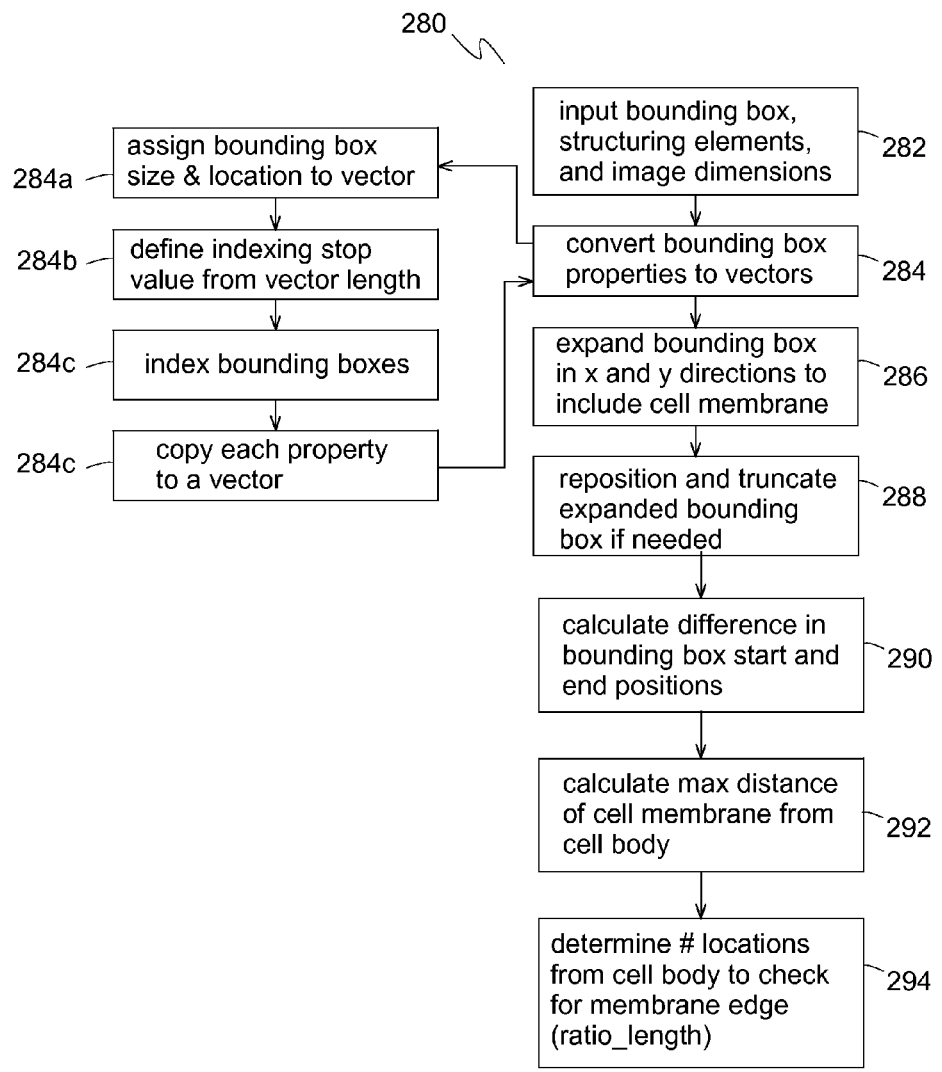
FIG. 13 is a flow diagram illustrating steps of one embodiment of a bounding box algorithm of the present invention.

Referring to FIG. 13, a flow chart illustrates steps performed in one embodiment of a bounding box algorithm 280. In bounding box algorithm 280, the cell body bounding box, calculated as one of the cell body properties in step 220, is expanded to include the fertilization membrane. In step 282, bounding box algorithm 280 inputs the structure array obj (containing structuring elements) and dimensions of the original grayscale image. MATLAB uses the commands obj→obj, I.dim→I_dim; [x,y,ratio_length,hull_expand_limit]=bs_analysis_resize(obj,I.dim).

In step 284, each bounding box is preferably converted to vectors. In step 284a, the location and size of a bounding box for each cell body is preferably assigned to a vector. For each bounding box the vector contains the x and y coordinates of the box's start location, the length of the bounding box along the x-axis, and the length of the bounding box along the y-axis. This step is repeated for each cell that was detected and stored in a list as shown below: boundingboxall=[cell_1_x_start cell_1_y_start cell_1_x_length cell_1_y_length cell_2_x_start cell_2_y_start cell_2_x_length cell_2_y_length . . . ]

Defining the bounding box with a vector speeds up algorithm performance, and the vector makes the bounding box information easier to access. These vector values initially define the bounding box. The bounding box will be expanded in Step I.5. MATLAB uses the command boundingboxall=[obj.BoundingBox].

In step 284b, the length of the bounding box vector from step 284a is used to define an indexing stop value. MATLAB uses the command bb_legnth=length(boundingboxall).

In step 284c, indexes are created and used to identify and separate values for each cell's bounding box. The vector holding all the bounding box values is easier to work with in separate variables. Each index will be used in the next step to copy a specific bounding box property to a new vector. For example, the kx_start index selects the starting x location of each cell's bounding box. This bounding box property shows up in the boundboxall vector every four values, starting with the first value in the boundboxall vector. MATLAB uses the commands kx_start=1:4:bb_legnth; ky_start=2:4:bb_legnth; kx_length=3:4:bb_legnth; and ky_length=4:4:bb_legnth.

In step 284d, individual bounding box properties for each cell are copied into new vectors for a specified property. For example, the kx_length index vector will only select the x length of the bounding box for each cell and then place those values into the x_length vector. The end result of this is that the bounding box properties have been converted to vectors or "vectorized." Since MATLAB work best with vectors in terms of speed and memory usage, vectorization is key to speeding up any MATLAB process. With each property vectorized, the bounding box can be expanded in the next step. MATLAB uses the commands x_length=boundingboxall(kx_length); y_length=boundingboxall(ky_length); x_start=boundingboxall(kx_start); and y_start=boundingboxall(ky_start).

In step 286, a bounding box expansion algorithm is used to expand a bounding box in a specific direction. The first call to step 286 expands the bounding box along the x-axis and the second call expands bounding box along the y-axis. To expand along a specific axis, the start location along that axis and the length of the bounding box along that axis are imported into algorithm of step 286. MATLAB uses the commands [x_start_loc,x_end_loc]=bs_analysis_expand (x_length,x_start); and [y_start_loc,y_end_loc]=bs_analysis_expand(y_length,y_start).

Bounding box expansion in step 286 begins by calculating an increase of 25% for the bounding box length. The 25% increase is a preferred value that creates a bounding box that includes both the cell body and the membrane surrounding the cell. The 25% increase value may have to be changed if the cell type has a thicker membrane or for other applications of method 400. Image resolution does greatly affect the 25% value other than the situation where an image has such poor resolution that the cell body is too small to be imaged. MATLAB uses the command x_inc=round(x_length*1.25).

The difference between the original and new bounding box lengths is then calculated. This differential length is used to calculate the new start location of the bounding box. The new starting location of the bounding box is a location that is outside the membrane edges. MATLAB uses the command x_diff_len=x_inc−x_length. The half-length difference is then calculated. This length is used to specify the distance that the original starting location will be moved to account for the cell membrane. MATLAB uses the command x_half_diff_len=round(x_diff_len/2).

A new start location is calculated to be used for moving the bounding box using the half-length difference value. This new start location should be smaller than the original start location. To prevent a situation in which the start location is not smaller than the original, the algorithm rounds down the original starting location to an integer value. The integer value, with the half-length difference subtracted, is the new starting location of the bounding box. The new start location x_start_loc is dynamically created based on the cell size. MATLAB uses the command x_start_loc=floor(start_org)−x_half_diff_len. A new end location based on the new bounding box length is also calculated. Step 286 subtracts 1 to account for MATLAB starting all indexes at 1. MATLAB uses the command x_end_loc=x_start_loc+x_inc−1.

Step 286 calculated the bounding box start and end locations dynamically, based on the cell body size. The x_start_loc and x_end_loc are exported out of the sub-function as x_start_loc,x_end_loc for the x axis and y_start_loc,y_end_loc for the y axis.

In step 288, the new start and end locations of each cell's bounding box are checked and adjusted as needed to confirm that all the bounding box locations are within the boundaries of the grayscale image. Step 288 inputs all bounding box start and end locations, including those before and after expanding each bounding box. Input variables are renamed as follows; x_start_loc→x_min, x_end_loc→x_max, y_start_loc→y_min, y_end_loc→y_max, and I_dim→I_dim. For any bounding box location that is not within the boundaries of the grey scale image, the bounding box is modified to match the boundaries of the grayscale image. Step 288 is not affected by cell type or image resolution. MATLAB uses the command [x,y,xx_correction,yy_correction]=bs_analysis_resize_check(x_start_loc,x_end_loc,y_start_loc,y_end_loc,I_dim).

In step 288a, start and end locations of each bounding box are placed in an array for a specific axis. For each bounding box, the start and end location for the X-axis and for the Y-axis is placed in arrays ax and ay, respectively. The array rows of ax and ay rows have each cell's bounding box start and end locations, respectively. MATLAB uses the commands ax=[x_min; x_max].'; ay=[y_min; y_max].'.

In step 288b, values for any start locations that are too small (i.e., beyond limits of image) are removed from arrays ax and ay. The arrays ax and ay that have a logical value of one are start locations where the values are larger than 0. Start locations which are equal to 0, or are negative, have a logical value of 0. MATLAB uses the commands bx_s=(ax>0); by_s=(ay>0).

In step 288c, values for the end locations that are too large (i.e., beyond limits of image) are removed. The arrays that have a logical value of 1 are end locations where the values are less than the maximum value (I_dim) for that axis. End locations which are greater than the maximum for that axis have a logical value of 0. MATLAB uses the commands bx_b=(ax<=I_dim.x); by_b=(ay<=I_dim.y).

In step 288d, final bounding box arrays are created. Two new arrays are created that hold the modified start and end locations along the x and y axes. The algorithm inverts the logical arrays to contain ones where the statements are false. The algorithm also multiplies the too large array by the maximum values to get an array of maximum values. Each array is then added together so that only the valid values and the modified values are placed into the new array. MATLAB uses the commands x=~bx_s+~bx_b*I_dim.x+ax.*bx_s.*bx_b; y=~by_s+~by_b*I_dim.y+ay.*by_s.*by_b.

In step 288e, the amount of position change for each bounding box is calculated. The amount that either a start or end or both have been changed due to being over the boundaries of the original image is calculated. This is an optional step used for debugging only. MATLAB uses the command xx_correction=x−ax; yy_correction=y−ay.

Steps 288a-288e have truncated the starting and ending locations of the bounding box along both axes. This subfunction exports the start and stop locations for x and y axes, and the correction amount, if any, to the start and end location. Renaming of variables upon export is as follows: x→x, y→y, xx_correction→xx_correction, and yy_correction→yy_correction.

In step 290, the difference between the new starting location for the bounding box and the original starting location of the bounding box is calculated. The difference between the new ending location of the bounding box and the original ending location of the bounding box is calculated. These values are used to determine the length of the ratio array. The ratio array is an array that is used in a convex hull algorithm 320 to determine whether a cell is fertilized. MATLAB uses the commands diff_x_start=floor(x_start).'−x(:,1); diff_y_start=floor(y_start).'−y(:,1); diff_x_end=x(:,2)−(floor(x_start).'+x_length.'); diff_y_end=y(:,2)−(floor(y_start).'+y_length.').

The differences for both start and end locations are placed into arrays based on the axis they define. MATLAB uses the command diff_x=[diff_x_start,diff_x_end]; diff_y=[diff_y_start,diff_y_end].

In step 292, the length of the ratio array is calculated by finding the maximum difference value. The maximum difference value, when rounded to the nearest integer, is the maximum distance that the membrane edge could be from the cell body. Using the maximum value guarantees that a cell's membrane examination will have enough room in the array. MATLAB uses the command ratio_length=round(max(max([diff_x,diff_y]))).

In step 294, the value of ratio_length is calculated for the number of locations away from the cell body for use in convex hull algorithm 320. This number is defined for each individual cell. For an individual cell, the number of locations away from a cell body that are checked for a membrane is calculated by taking the minimum difference between the cell body and the location of the cell fertilization membrane. Using the minimum difference guarantees that the examination of the membrane will not extend beyond the boundaries of the bounding box. MATLAB uses the command hxl=floor(min(min(diff_x,diff_y),[ ],2)).

Bounding box algorithm 280 has calculated the correct size of a bounding box so that it is within the original grayscale image boundaries. Also calculated are the minimum number of locations to check for a membrane around a cell, and the maximum locations possible to check. Bonding box algorithm 280 exports variables x, y, ratio_length and hxl. Upon export, the variables are renamed as follows; x→x, y→y, ratio_length→ratio_length, and hxl→hull_expand_limit.

In other embodiments of method 400, an outer search limit is determined for searching for cell membrane edges. The outer search limit may be a bounding box as discussed above. The outer search limit may also be a bounding region, such as a circle or region of other shape that surrounds a cell body. The bounding region would be used similar to the bounding box discussed above, but would have a perimeter of a different shape. In yet another embodiment, the outer search limit is the sample image border itself. Of these available options, the use of a bounding box is preferred because of memory limitation and because it results in improved speed.

Shape Check Algorithm

Figure 14:
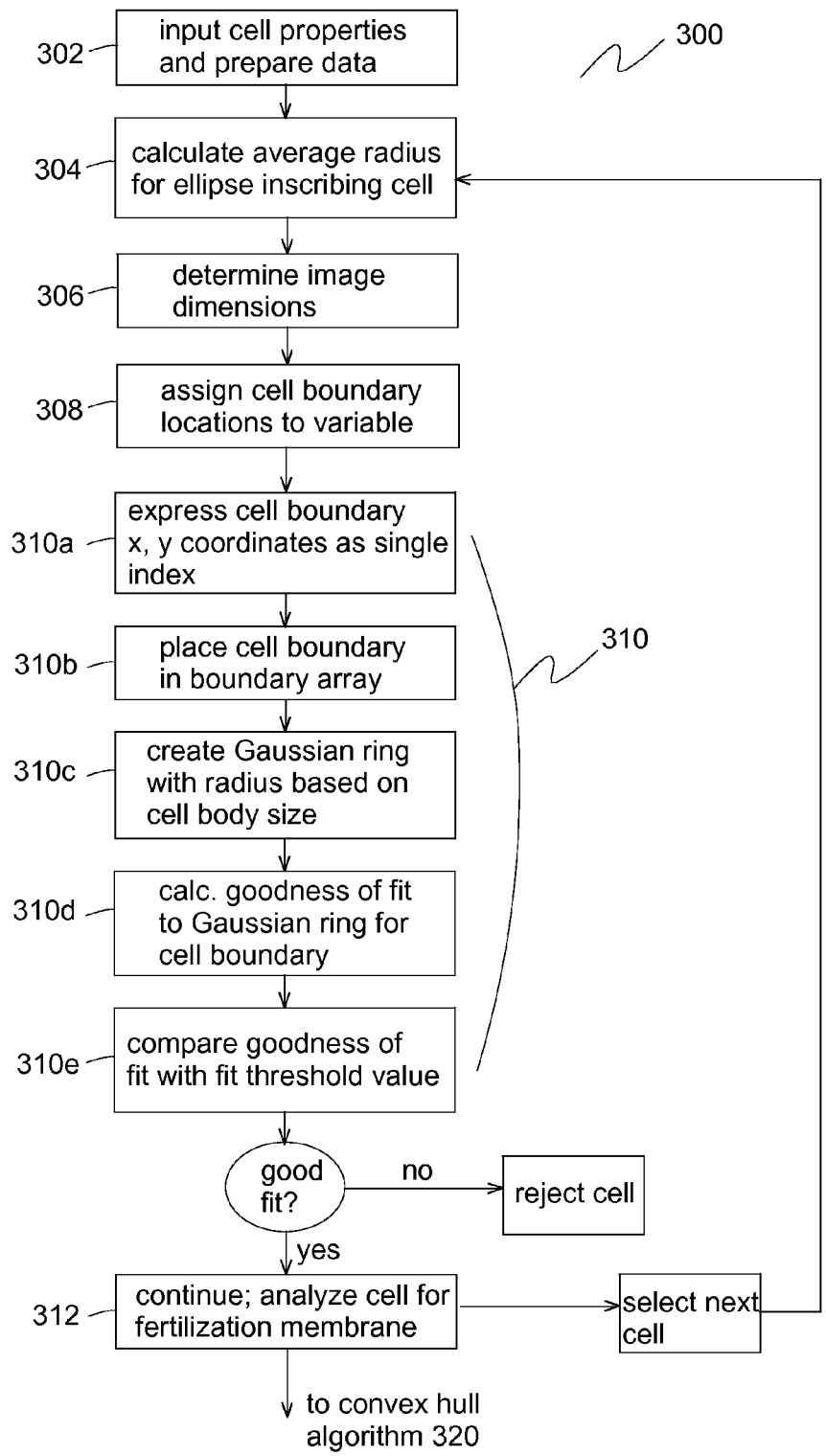
FIG. 14 is a flow diagram illustrating steps of a shape check algorithm of the present invention.

Referring to FIG. 14, a flow diagram illustrates steps in one embodiment of a shape check algorithm 300. As a preliminary step, the major and minor axes for an ellipse that inscribes the cell body are assigned to an array. Each cell's major axis is in one column and the minor axis is in another column. This optional step is improves access to these values in subsequent algorithm steps. MATLAB uses the command ax=[[obj.MajorAxisLength];[obj.MinorAxisLength]].

As another preliminary step, a ratio array is initialized. The number of rows is defined by the number of cells that were detected by cell segmentation algorithm 200 and, if needed, the number of cells detected by cell properties algorithm 220. The number of columns is defined by the variable ratio_length from step 294. The number of columns is the maximum number of locations away from the cell body that convex hull algorithm 320 will examine for fertilization membranes as determined by ratio_length. MATLAB uses the command ratio=zeros(length(B),ratio_length).

In step 302, shape check algorithm 300 inputs cell properties and other values, including the ratio array, each cell's centroid, the boundaries of each cell body, the limit on the number of locations away from the cell body to check for a membrane, the edges from the edge-detection algorithm 250, and the maximum and minimum radii of each cell's ellipse. The inputs are renamed inside the sub-function as follows: ratio→ratio, obj.Centroid→center_of_mass, B→B, hull_expand_limit→hxl, I.edge_canny→I_edges_no_cent, and ax→ax. MATLAB uses the command [ratio]=bs_analysis_hull_check(ratio,[obj.Centroid],B,hull_expand_limit,[I.edge_canny],ax).

In step 301, the center of mass location for each cell body is split into two parts. Splitting the center of mass locations for each cell into its x and y axis components makes working with the variables easier in the later steps. MATLAB uses the commands I=1:2:length(center_of_mass); com_x=center_of_mass(I); I=2:2:length(center_of_mass); com_y=center_of_mass(I).

In step 304, the average radius of each cell's ellipse is calculated. The average radius for each cell is computed by calculating the mean of the major and minor axes of an ellipse inscribing a specific cell. The resulting vector is used in step 310 to determine if the cell has the right shape. The shape if a cell has a very oblong or rectangular shape to it, then it might not be a cell. MATLAB uses the command radius=mean(ax, 1)./2.

In step 306, the dimensions of the original grayscale image are calculated or determined from the number of pixels along each axis of the image. The dimensions of the image are used in step 310 to convert between two methods of indexing an array. This is fully explained in step 310. MATLAB uses the command dim=size(I_edges_no_cent).

A FOR-loop is used to examine each cell for a fertilization membrane. The number of cells is equal to the number of cell body boundaries, which is also the number of rows in variable B. The variable k is used to select a specific cell to be analyzed. The specific cell is selected by using k as an index variable. MATLAB uses the command for k=1:length(B).

In step 308, a specific cell's boundary trace is assigned to a new variable named boundary. This new variable holds the x and y locations of a specific cell's boundary. The x and y values which indicate the location of the cell body boundary in the image are split into two variables for ease of use. MATLAB uses the commands boundary=B{k}; xx=boundary(:,2); yy=boundary(:,1).

In step 310, a sub-function is called to examine the selected cell body. This sub-function takes the x and y boundary locations, the original image dimension and the cell's average radius as inputs. From these inputs the sub-function determines if the cell is the correct shape by matching the cell boundary with a Gaussian ring. The matching function is a goodness-of-fit comparison between the Gaussian ring and the boundary. If the goodness of fit is poor then the cell is rejected. The goodness-of-fit calculation is insensitive to cell type (fertilized or unfertilized) and to image resolution. MATLAB uses the command tf=bs_analysis_shape_check(xx,yy, dim,radius(k)).

In step 310a, the locations of the cell body boundary expressed in x and y coordinates is converted to a single index value. This single index value starts at the location 1, 1 and increases along the first column, and then continues the single index count along the next row. An example code sequence is illustrated below:

a=[1 2 3;−1 −2 −3];
b=sub2ind([2 3], 2,2);
b equals 4
Using b as a location in a gives
a(b)=2
subscript=sub2ind(dim,y_index,x_index);

In step 310b, a binary array is created with size equal to the original image. This array is initially filled with zeros. The boundary for the selected cell body is placed into the binary array. This array will be compared with the Gaussian ring created in the next step. MATLAB uses the commands cell_boundary=zeros(dim); cell_boundary(subscript)=1; ring=bs_gaussian(radius,1).

Figure 15:
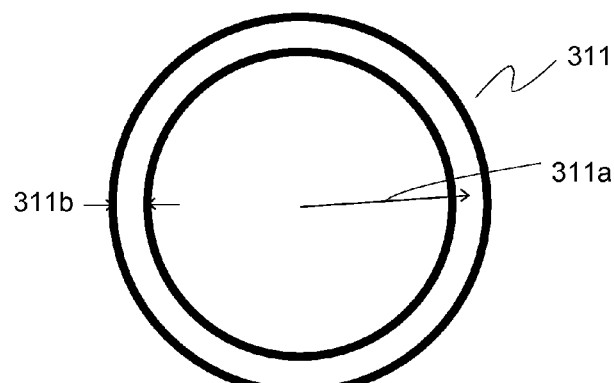
FIG. 15 illustrates an example of a Gaussian ring as used in one embodiment of the method.
Figure 16:
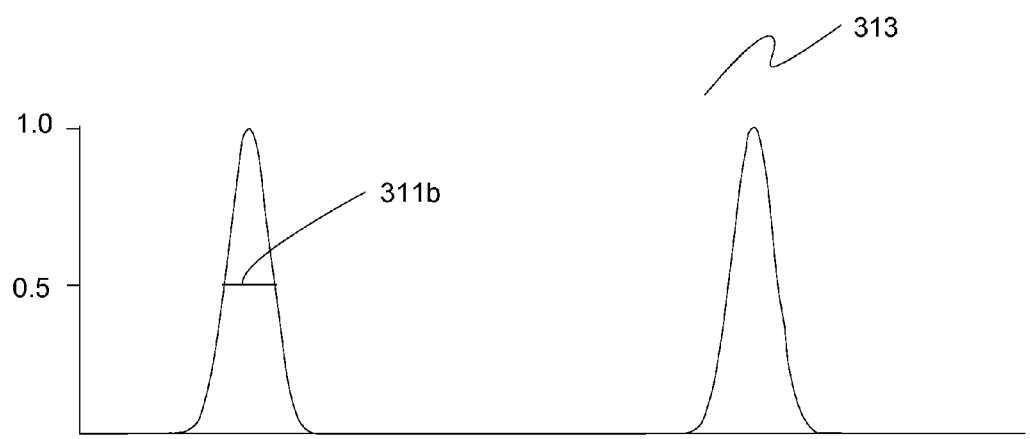
FIG. 16 illustrates a graph of a profile of an edge of the Gaussian ring of FIG. 13.

Referring also to FIGS. 15 and 16, a Gaussian ring is created in step 310c having a radius based on the size of the selected cell body. FIG. 15 shows an example of a Gaussian ring 311 with radius 311a. The width 311b of Gaussian ring 311 at full width, half maximum is 1 pixel. The width of 1 pixel is not sensitive to the resolution of the image. The result is a ring with a Gaussian probability profile 313 when viewed as a cross section of Gaussian ring 311 as illustrated in FIG. 16 and discussed below with an example.

In step 310d, a MATLAB 2D cross correlation filter is used to calculate the goodness-of-fit value. The cross correlation function calculates the 2D convolution between the Gaussian ring and the cell body boundary outline. The result from the convolution is an array that has a goodness-of-fit value for each location where the Gaussian ring is placed relative to the cell body. The largest goodness-of-fit value is the location where the best fit was calculated. The best goodness of fit value is the maximum value of the Cross_Corrilation array. This value is used in determining if the cell has the correct shape to be examined for a fertilization membrane. MATLAB uses the commands Cross_Corrilation=filter2(ring,cell_boundary); maxmax_array=max(Cross_Corrilation(:)).

In step 310e, a fit threshold value is used for determining whether a cell has the correct shape. In one embodiment, the fit threshold value of 200 is preferred based on experimentation and past data. Once entered, the fit threshold value would not need to be changed if the cell type or resolution of the image changed. MATLAB uses the command threshold_cc=200.

The maximum value from the filter function is compared with the fit threshold value. If the maximum value is larger than the threshold, then the result is set to one (a good fit), otherwise the result is set to zero (a poor fit). In the case of a good fit, the result=1 and the cell analysis for a fertilization membrane continues. The index variable k is incremented by 1 and the FOR loop is started again. In the case of a poor fit, the result=0 and the cell is skipped for fertilization membrane analysis. MATLAB uses the command if tf==0.

In step 312 the MATLAB function "continue" executes. This function forces the algorithm to increment the "k" index by 1 and restart the "FOR loop" with the new k value. This means that the algorithm will not examine cells for fertilization membranes having a fit below the threshold value, but will continue to examine cells for a fertilization membrane having a goodness-of-fit value above the fit threshold value.

Convex Hull Algorithm.

Figure 17:
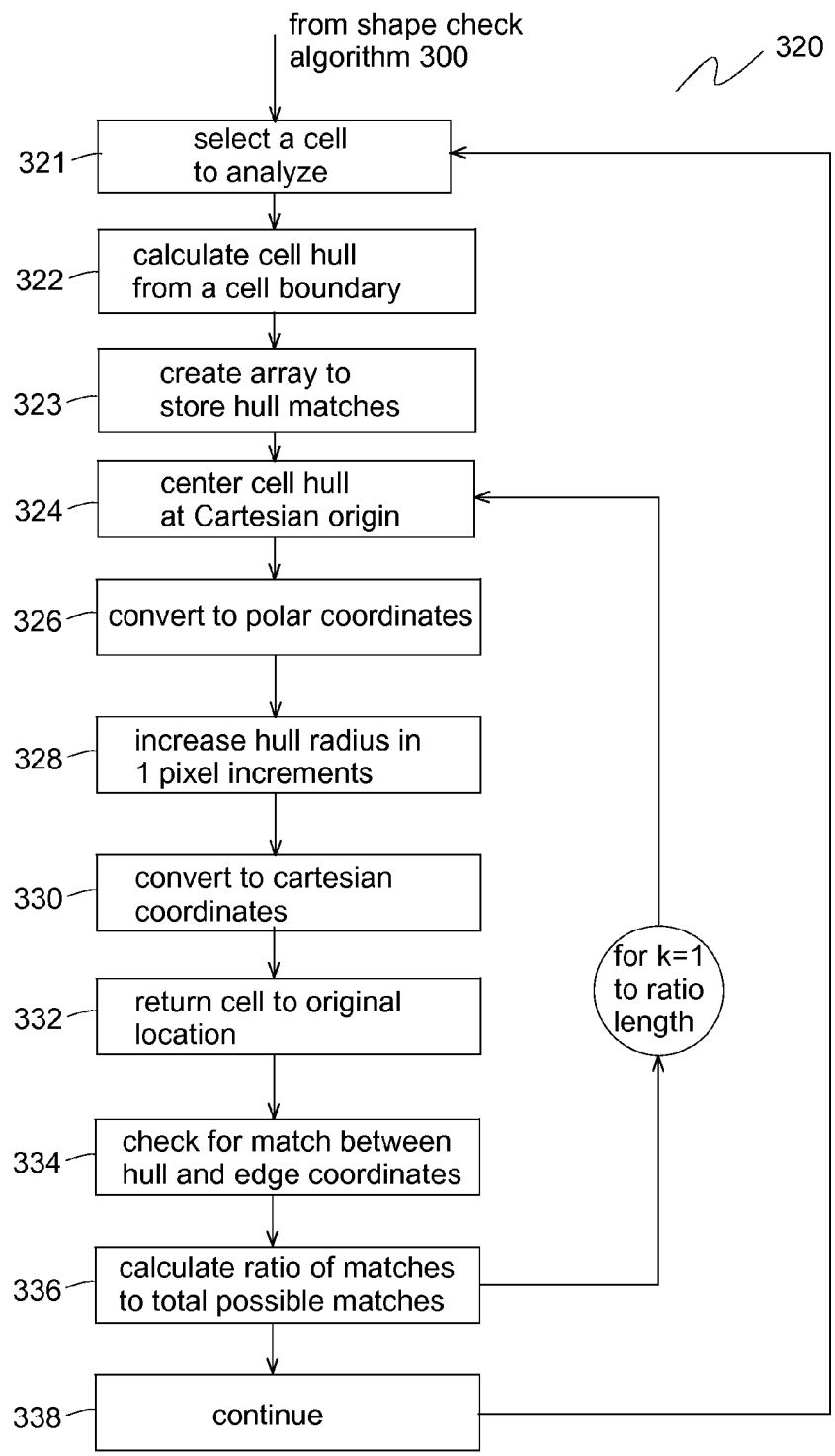
FIG. 17 is a flow diagram illustrating steps of one embodiment of a convex hull algorithm of the present invention.

Referring to FIG. 17, a flowchart illustrates steps performed in one embodiment of a convex hull algorithm 320. Convex hull algorithm continues analysis of a selected cell body from step 312 of shape check algorithm 300. In step 321, a cell is selected for analysis. In step 322, MATLAB's convex hull function computes the convex hull of the cell boundary for a selected cell body. The convex hull function selects only the locations along the cell boundary that are not convex in relation to the surrounding locations. A simplified way to think of the result from a convex hull is that the cell boundary is wrapped like a package. When wrapping the package, the paper does not follow the contours of the package exactly. Instead, the paper's contour is defined by parts of the package that stick out or protrude relative to neighboring locations on the package surface. The wrapped object thus has a simplified geometry compared to the actual object surface because the wrapping extends between points that protrude rather than following the actual surface of the package between those points. The portions of the package's surface that do not define the shape of the wrapping paper are the convex parts of the package. The wrapping paper is the hull. The cell's hull is what is returned from the convhull command when applied to a cell body. MATLAB uses the command f_con_hull=convhull(yy,xx).

In step 323, an array filled with zeros, ratio_pre, is created to hold the two values calculated from the membrane matching steps discussed below. The ratio_pre array is used by the algorithm to preallocate system memory. MATLAB uses the command ratio_pre=zeros(hxl(k),2). Starting with step 324, a FOR-loop will be used to outwardly expand the hull radius, where the hull radius extends from the cell body center of mass towards the edge of the bounding box. MATLAB uses the command for n=1:hxl(k).

In step 324, the hull for the cell being examined is moved to have its center located at the origin (0, 0) in a Cartesian (x, y) coordinate system. The hull centered at the origin allows the hull to be expanded symmetrically about the origin. MATLAB uses the commands xx_zero_cent=xx(f_con_hull)−com_x(k); yy_zero_cent=yy(f_con_hull)−com_y(k).

In step 326, a MATLAB function converts the array from Cartesian coordinates to polar coordinates (i.e., radius and angle). This conversion is used by the algorithm to radially explore the area surrounding the cell body to find a fertilization membrane. MATLAB uses the command [TH,R]=cart2pol(xx_zero_cent,yy_zero_cent).

In step 328, the cell's hull is expanded radially in an increment of 1 pixel. To increase the radius of the hull by a single pixel, the radius of the cell body is added to the current step number in the FOR-loop. The step number in the FOR-loop is also the distance in pixels that the hull is expanded outwardly from the cell body. The algorithm uses the expanding hull algorithm to explore the region around the cell to find fertilization membrane edges. MATLAB uses the command R=R+n−1.

In step 330, the MATLAB function pol2cart converts the polar coordinates back to Cartesian coordinates. Step 330 is performed so that algorithm 320 can compare the locations of the convex hull to the locations of the edges within the cell's bounding box. MATLAB uses the command [xx_zero_cent_exp,yy_zero_cent_exp]=pol2cart(TH,R).

In step 332, the hull is moved back to its original location. Moving the hull to its original location is accomplished by adding the center of mass location to the now-expanded x and y hull locations. In the next step, the hull is checked to see if it matches the edges detected by membrane algorithm 250. MATLAB uses the command xx_hull_cell=round(xx_zero_cent_exp+com_x(k)); yy_hull_cell=round(yy_zero_cent_exp+com_y(k)).

In step 334, the hull is used to select the locations from the binary edge detection array I.edge_canny from step 270. The points that make up the convex hull are used to sample the membrane at a specific radius. The values from the binary edge detection array I.edge_canny are checked against hull locations and saved to the variable hull_matches. This vector has either zeros (no match) or ones (match) for each pixel location in I.edge_canny. The hull_match vector values will be used in the next steps to count the number of hull and edge detection matches. MATLAB uses the command hull_matches=I_edges_no_cent(sub2ind(size(I_edges_no_cent), yy_hull_cell, xx_hull_cell)).

In step 336, the ratio is calculated for the number matches to the maximum number of possible matches at a given hull. The maximum number of matches is the length (total number of elements) of the hull_match vector. MATLAB uses the command ratio_pre(n,1)=length(hull_matches). The number of matches between the hull locations and the edge detection array by summing the hull_match vector. This sum function adds the logical ones of the hull_match vector to yield a total number of matches. MATLAB uses the command ratio_pre(n,2)=sum(hull_matches).

The match ratio for the number of matches to the total possible matches is calculated. The match ratio value is used in fertilization algorithm 350 to determine if the membrane is a fertilized membrane or a non-fertilized membrane. To facilitate that determination, each radius for a specific cell is saved to the ratio array. The array can be processed in one step, which speeds up the algorithm. MATLAB uses the command ratio(k,n)=ratio_pre(n,2)/ratio_pre(n,1).

Convex hull algorithm 320 used a FOR-loop to check the area around a specific cell for membrane edges. To determine the presence of a membrane edge, a hull was formed around the cell body and expanded with each loop of the algorithm. If the hull matched a detected edge, then a match was counted. The ratio for the number of matches to the total possible number of matches was calculated for this cell. In another embodiment of convex hull algorithm 320, the cell hull is contracted in size from the outer search limit (bounding box) towards the cell body boundary.

A second FOR-loop selected each cell and created the hull for the selected cell. This is the end of the sub-function L. This sub-function has checked the area around the each cell for a fertilization membrane. Convex hull algorithm 320 does not determine if the cell is a fertilized or not. Convex hull algorithm 320 exports the ratio of hull match variables renamed as follows: ratio→ratio.

In other embodiments of method 400, a cell outline may be defined. The cell outline may be the cell hull as described above. The cell outline may also be defined by the cell body boundary or a plurality of points that make up the cell hull or cell body boundary. The cell outline size may similarly be adjusted between the cell body boundary and the outer search limit to search for cell membrane edges.

Fertilization Algorithm

Figure 18:
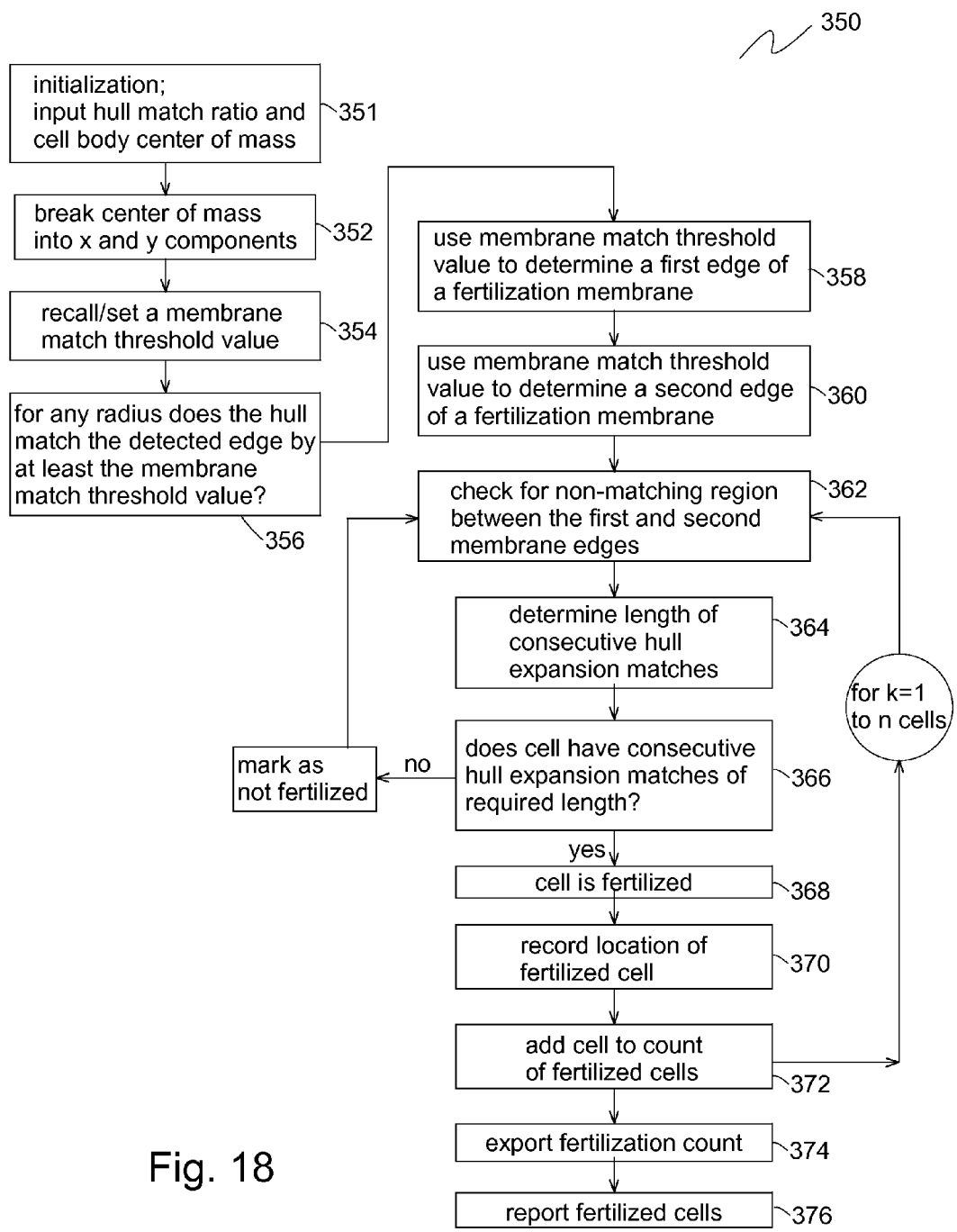
FIG. 18 is a flow diagram illustrating steps of one embodiment of a fertilization algorithm of the present invention.

Referring to FIG. 18, a flowchart illustrates steps performed in one embodiment of a fertilization algorithm 350 used to determine if a cell is fertilized. Fertilization algorithm 350 takes in the ratio variable exported from convex hull algorithm 320 and the center of mass for a selected cell. MATLAB uses the command [fert_count,fert_location]=bs_analysis_threshold_check(ratio,[obj.Centroid]).

In an initialization step 351, the number of fertilized cells is set to zero. This is an initialization step, done in case there are no fertilized cells. MATLAB uses the command fert_count=0. Step 351 also creates a Not a Number (NaN) array named fert_location. This array has a number of rows equal to the total number of cells. The array has two columns that hold the x and y coordinates of each cell's center of mass. A value for fertilization count is exported from fertilization algorithm 350, so the fert_location array must be initialized. The values initializing the array cannot be values that can be plotted. In MATLAB, NaN arrays cannot be plotted, but do not cause the program to exit with an error. Thus, NaN arrays make ideal initialization values. MATLAB uses the command fert_location=NaN(size(ratio,1),2).

In step 352, the selected cell's center of mass location is broken into x and y axis components. This is the same process as performed in step 301 of shape check algorithm 300. MATLAB uses the commands n=1:2:length(center_of_mass); com_x=center_of_mass(n); n=2:2:length(center_of_mass); com_y=center_of_mass(n).

In step 354, a membrane match threshold value is initialized. For each cell, the membrane match threshold value is used to determine whether enough matched edges are present at a specific radius to be counted as a valid membrane edge. In one embodiment, the membrane threshold value is fifteen percent (15%). The membrane match threshold value is used to determine the location of a first membrane edge, the location of a second membrane edge, and whether a membrane is counted as a valid fertilization membrane. If at least 15% of the hull locations match or coincide with the corresponding edge locations as determined by the edge detection function, the match meets or exceeds the membrane match threshold value. MATLAB uses the command ratio_thresh=0.15.

In step 356, the membrane match threshold value is applied to each cell. If the match ratio for any radius for a selected cell is equal to or above the membrane match threshold value, then a value of 1 is placed into a new threshold array named above_thresh for that radius and cell. Otherwise a value of 0 is placed in the above_thresh array for that radius and cell to indicate that the cell is not counted as having a valid fertilization membrane. MATLAB uses the command above_thresh=ratio>=ratio_thresh.

In step 358, the membrane match threshold value is used to determine a first edge of a fertilization membrane. Step 358 begins by creating a vector of zeros, or zero buffer, and adding the zero buffer as a first column to the threshold array above_thresh. This vector is used to keep the resulting differential array the same size as the threshold array above_thresh when calculating the difference between adjacent elements. MATLAB uses the command zero_buffer=zeros(size (above_thresh,1),1).

Differences between adjacent elements in the threshold array above_thresh are calculated. The resulting first differential array is calculated by taking a value in one column and subtracting the value in the preceding adjacent column. The general formula is $$[X(2)-X(1), X(3)-X(2), \ldots, X(n)-X(n-1)] \quad (6)$$

Positive values in the first differential array reveal the start of a series of ones. A series of ones starting in a specific row of the threshold array above_thresh indicates where the hull matches are above the membrane match threshold value. Knowing where the hull match values change to being above the membrane match threshold value indicates a first membrane edge of a fertilization membrane. MATLAB uses the command diff_start=diff([zero_buffer,above_thresh],1,2).

In step 360, a second membrane edge is similarly calculated and stored in a second differential array. The second membrane edge corresponds to the location where a fertilization membrane ends. This step is similar to step 358, except that a zero buffer vector is added as the last column to the threshold array above_thresh. As a result, when the difference is calculated between the value in one column and the value in the preceding adjacent column, a difference value of −1 in the second differential array indicates a location where a series of ones ended in the above_thresh array. The end of a series of ones means that the hull matching ratio has fallen below the membrane match threshold value. Locations in the second differential array where the hull matching ratio falls below the membrane threshold value indicate the end or second edge of the fertilization membrane. MATLAB uses the command diff_end=diff([above_thresh,zero_buffer],1,2).

In step 362, a FOR-loop is initialized to process each cell individually. Each cell is checked for an indicator of a fertilization membrane. The indicator of fertilization is two hull matches separated by at least one hull non-match, or a region between the first membrane edge and the second membrane edge that is below the membrane match threshold value. MATLAB uses the command for k=1:size(above_thresh,1).

In step 364, the length of consecutive hull matches is determined. The start locations of any consecutive hull matches are determined by finding the beginning of +1 values in the first differential array. The start location of hull matches in the first differential array, also known as the index value, is stored in the index_start array. MATLAB uses the command index_start=find(diff_start(k,:)==1).

Next, the end locations for any series of consecutive hull matches are determined. This process is similar to the calculation of the index start value, except that the location of the −1 values in the second differential array diff_end are stored in the index_end array. The index start value and the index end value are used to calculate the length of the consecutive series. (i.e., the number of consecutive hull matches for a specific cell). MATLAB uses the command index_end=find (diff_end(k,:)==−1).

The length of all consecutive hull matches is found by subtracting the index start value index_start from the index end value index_end and then adding one to the result. One is added because the difference indicates the distance from start to end, but does not indicate the number of hull expansions included, or length, from start to end. This result is the length or number of consecutive hull matches for a particular cell. With each length known, all that remains is to find the number of series consecutive matches with the required series length. MATLAB uses the command length_of_series=index_end−index_start+1.

In step 366, fertilization algorithm 350 determines whether a call has at least two series of consecutive hull matches each series having a length of two or more. First, the MATLAB find function is used to find all the consecutive matches that are longer than or equal to 2 consecutive hull expansions are found. A series length of 2 consecutive hull expansions is preferably used in step 366 because the cell's hull generally does not match perfectly with the edges of the fertilization membrane. Having at least two series of consecutive hull expansion matches also eliminates false positives for fertilization due to single edges in the edge detection I.edge_canny array that are not membrane edges. After all the series of consecutive hull matches have been found, the number of consecutive match series having a length of 2 or more is determined and stored in the variable sls. An example below illustrates variable sls, where each number enclosed by brackets in the variable length_of_series represents the series length of consecutive hull matches:

length_of_series=[1 2 2 4 1], this results in sls=3, this is fertilized.

length_of_series=[1 2 1 1 1], this results in sls=1, this is not fertilized.

length_of_series=[2 2 1 2 2], this results in sls=4, this is fertilized.

MATLAB uses the command sls=length(find((length_of_series>=2)==1)).

In step 368, a determination is made about the area surrounding a cell. If the cell has two or more series of consecutive hull matches, where the series length is at least two consecutive hull expansions, then the cell determined to have a fertilization membrane. MATLAB uses the command if sls>=2.

In step 370, when a cell has been determined to be fertilized, the cell's center of mass is placed into an array. The location of the center of mass in x and y coordinates replaces the NaN values for that cell. This array is used later to indicate graphically to the user which cells are fertilized in the original grayscale image. MATLAB uses the command fert_location (k,:)=[com_y(k),com_x(k)].

In step 372, the number of fertilized cells is incremented by 1. This value is used to inform the user of the total number of fertilized cells found by the algorithm. MATLAB uses the command fert_count=fert_count+1.

This IF-loop counts the number of fertilized cell and records the location of the cell. The location is used to indicate which cell is fertilized graphically, by placing a marker on the cell in the original grayscale image.

This FOR-loop has examined each cell and determined which one was fertilized. The way that a cell is determined to be fertilized is by checking to see if there are 2 consecutive hull expansions that are above the threshold value. If there are two series of 2+ consecutive hull expansions, then the cell is fertilized.

In step 374, the fertilization count fert_count and the location of the fertilized cells fert_location are exported. Upon export, variables are renamed as follows: fert_count→fert_count and fert_location→fert_location.

In 376, fertilization test results are reported to the user. In one embodiment, fertilized eggs are reported by marking, highlighting, or otherwise indicating the fertilized eggs in the original grayscale image. Fertilization test results may also be reported in a table, in text format, plotted, or represented in any other method that conveys the number and/or ratio of fertilized cells in the grayscale image. MATLAB uses the command bs_analysis_plot(RGB,I,B,fert_location,x,y, pfname,fert_count).

In other embodiments of method 400, cell fertilization is determined using other techniques. In one embodiment, for example, circles of various sizes are iteratively matched to cell membrane edges and may also be matched to the cell body boundary. After exhausting various combinations of circles, cell fertilization is determined by finding matches between circles and detected cell membrane edges. This method unfortunately is relatively slow and has not yielded satisfactory results.

Figure 19:
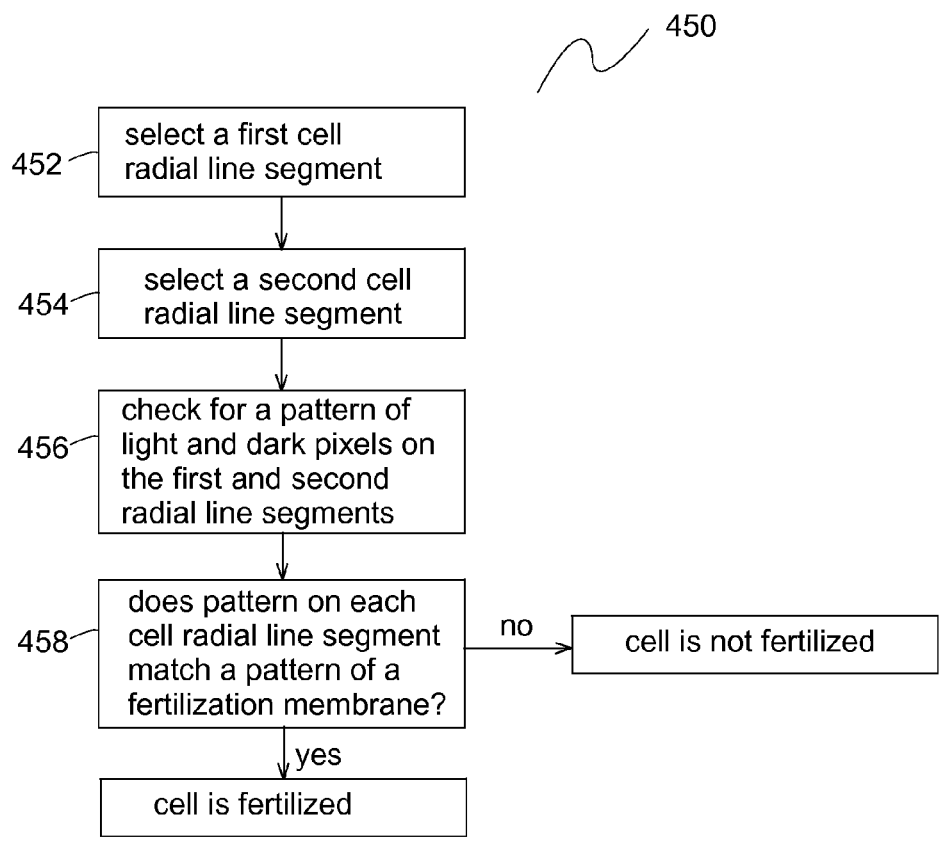
FIG. 19 is a flow diagram illustrating steps of another algorithm for determining cell fertilization.

In another embodiment shown in FIG. 19, lines or line segments extending along cell radial lines are used to determine cell fertilization in algorithm 450. Cell radial line segments are selected that extend from the cell center of mass. In step 452, a first cell radial line segment is selected. In step 454, a second radial line segment is selected. The cell radial line segments extend past the cell body boundary and form a sector of the cell. In step 456, points along each cell radial line segment are analyzed for an alternating pattern of pixel instensity (e.g., changes between light and dark) that correspond to edges of a cell fertilization membrane, the region between the cell body and the inner cell membrane edge, the region between the inner and outer cell membrane edges, and the region radially beyond the outer cell membrane edge. In step 458, the alternating pattern on the first cell radial line segment is checked for consistency with a cell fertilization membrane and for a match with an alternating pattern on the second cell radial line segment. A cell is determined to be fertilized when the first cell radial line and the second cell radial line each have a matching alternating pattern of pixel intensity indicated by a region radially between the cell body boundary and a first cell membrane edge, a first cell membrane edge, a region radially between the first cell membrane edge and a second cell membrane edge, the second cell membrane edge, and a region radially beyond the second cell membrane edge. The alternating pattern is, for example, light-dark-light-dark-light. Of the available methods, the preferred method is described above in fertilization algorithm 320 using a cell hull (or cell outline) changed in size incrementally.

An exemplary MATLAB code sequence follows for one embodiment of method 400.

```
I=rgb2gray(RGB);
ele=bs_analysis_elements;
disk_ele=strel('disk',20);
ele.box_ele=strel(ones(5,5));
ele.se_h=strel('line',5,0);
ele.se_v=strel('line',5,90);
I_e=imerode(I,ele.disk_ele);
I_obr=imreconstruct(I_e,I);
I_obrd=imdilate(I_obr,ele.disk_ele);
I_obrcbr=imreconstruct(imcomplement(I_obrd),I_obr);
forground_m=~imregionalmax(I_obrcbr);
forground_m2=imfill(forground_m,'holes');
forground_m3=imclose(forground_m2,ele.box_ele);
fgm=bwareaopen(forground_m3,1500);
fgm_s=fgm;
fgm_s=imerode(fgm_s,disk_ele);
D=bwdist(~fgm);
Dc=-D;
Dc=Dc+abs(min(min(Dc)));
Dc(fgm_s)=0;
DL=watershed(Dc);
bgm=DL==0;
bw=~(bgm|~fgm);
bw=imclearborder(bw,4);
bw=bwareaopen(bw,1000);
B,L]=bwboundaries(bw,'noholes');
obj=regionprops([I.L],'BoundingBox','Area','Centroid',...
    'MajorAxisLength','MinorAxisLength');
area_threshold_s=50e3;
area_threshold_l=100e3;
idx=find(([obj.Area]<area_threshold_s)|(area_threshold_l<[obj.Area]));
if isempty(idx)==0
cc=bwconncomp(I.bw);
all_objects=1:length(B);
too_small=setdiff(all_objects,idx);
I.bw=ismember(labelmatrix(cc), too_small);
[B,I.L]=bwboundaries(I.bw,'noholes');
obj=regionprops([I.L],'BoundingBox','Area','Centroid',...
    'MajorAxisLength','MinorAxisLength');
I_edges=edge(I_obr,'canny');
I_ed_op_v=imdilate(I_edges,ele.se_v,'same');
I_ed_op=imdilate(I_ed_op_v,ele.se_h,'same');
I_clean_edges=bwareaopen(I_ed_op,5000);
I_min_edges=bwareaopen(I_clean_edges & I_edges,20);
I_mask_shell=imdilate(bw,ele.disk_ele);
I_mask_shell=imdilate(I_mask_shell,ele.disk_ele);
I_ring=~bw & I_mask_shell;
I_edge_torus=I_ring & I_min_edges;
for k=1:length(B)
    boundary=B{k};
    xx=boundary(:,2);
    yy=boundary(:,1);
    f_con_hull=convhull(yy,xx);
    x_length=obj.boundingbox(k).BoundingBox(1,3);
    y_length=obj.boundingbox(k).BoundingBox(1,4);
    x_half_hight=x_length/2;
    y_half_hight=y_length/2;
    x_half_inc=(1.25*x_half_hight);
    y_half_inc=(1.25*y_half_hight);
    x_inc=round(x_half_inc*2);
    y_inc=round(y_half_inc*2);
    x_diff_len=x_inc-x_length;
    y_diff_len=y_inc-y_length;
    xx_shift=xx(f_con_hull)-min(xx(f_con_hull))+round(x_diff_len/2);
    yy_shift=yy(f_con_hull)-min(yy(f_con_hull))+round(y_diff_len/2);
    x_start_loc=floor(obj.boundingbox(k).BoundingBox(1,1))-round(x_diff_len/2);
    y_start_loc=floor(obj.boundingbox(k).BoundingBox(1,2))-round(y_diff_len/2);
    x_end_loc=x_start_loc+x_inc-1;
    y_end_loc=y_start_loc+y_inc-1;
    if x_end_loc>size(I,2)
        shorten=x_end_loc-size(I,2);
        x_end_loc=size(I,2);
```

```
    else
        shorten=0;
    end
    if y_end_loc>size(I,1)
        if shorten<(y_end_loc-size(I,1))
            shorten=y_end_loc-size(I,1);
        end
        y_end_loc=size(I,1);
    end
    x=x_start_loc:x_end_loc;
    y=y_start_loc:y_end_loc;
    try
        imagesc(I(y,x))
    catch over_area
        x_min=min(x);
        x_max=max(x);
        y_min=min(y);
        y_max=max(y);
        xx_correction=0;
        yy_correction=0;
        if (0>=x_min) && (0>=y_min) && ... (x_max>size(I,2)) && (y_max>size(I,1))
            x_start_loc=1;
            x_end_loc=size(I,2);
            y_start_loc=1;
            y_end_loc=size(I,1);
        else if (0>=x_min)||(0>=y_min)
            if (0>=x_min) && (0>=y_min)
                x_start_loc=1;
                xx_correction=x_min+1;
                y_start_loc=1;
                yy_correction=y_min+1;
            else if 0>=x_min
                x_start_loc=1;
                xx_correction=x_min+1;
            else
                y_start_loc=1;
                yy_correction=y_min+1;
            end
        else if (x_max>size(I,2))||(y_max>size(I,1))
            if (x_max>size(I,2)) && (y_max>size(I,1))
                x_end_loc=size(I,2);
                xx_correction=x_max-size(I,2);
                y_end_loc=size(I,1);
                yy_correction=y_max-size(I,1);
            else if x_max>size(I,2)
                x_end_loc=size(I,2);
                xx_correction=x_max-size(I,2);
            else
                y_end_loc=size(I,1);
                yy_correction=y_max-size(I,1);
            end
        end
        x=x_start_loc:x_end_loc;
        y=y_start_loc:y_end_loc;
        imagesc(I(y,x))
        xx_shift=xx_shift+xx_correction;
        yy_shift=yy_shift+yy_correction;
    end
    title(['Cell No.:', num2str(k)])
    colormap winter
    hold on
    plot(xx_shift,yy_shift,'w','LineWidth',2);
    hold off
    [B,L]=bwboundaries(bw,'noholes');
    I_edge_bbox=I_edges_no_cent(y,x);
    center_of_mass=obj.centermass(k).Centroid;
    max_width=abs(floor(x_half_inc)-floor(x_half_hight)-shorten-6);
    ratio_pre=zeros(max_width,2);
    for n=1:max_width
        xx_zero_cent=xx(f_con_hull)-center_of_mass(1);
        yy_zero_cent=yy(f_con_hull)-center_of_mass(2);
        [TH,R]=cart2pol(xx_zero_cent,yy_zero_cent);
        R=R+n;
        [xx_zero_cent_exp,yy_zero_cent_exp]=pol2cart(TH,R);
        xx_expand=xx_zero_cent_exp+mean(xx_shift)+(-1*floor(mean(xx_zero_cent_exp)));
        yy_expand=yy_zero_cent_exp+mean(yy_shift)+(-1*floor(mean(yy_zero_cent_exp)));
        hold on
        plot(xx_expand,yy_expand,'rx','LineWidth',2)
        hold off
        xx_expand_r=floor(xx_expand);
        yy_expand_r=floor(yy_expand);
        ob=zeros(size(xx_expand_r));
        for bun=1:size(xx_expand_r)
            try
                ob(bun)=I_edge_bbox(yy_expand_r(bun),xx_expand_r(bun));
            catch too_far
                ob=ob(1:bun);
                break
            end
        end
        ratio_pre(n,1)=size(ob,2);
        ratio_pre(n,2)=sum(ob);
    ratio_pre(n,1)=size(ob,2);.
        ratio(k,n)=ratio_pre(n,2)/ratio_pre(n,1);
    end
end
ratio_thresh=0.15;
above_thresh=ratio>=ratio_thresh;
for k=1:size(above_thresh,1)
    temp=above_thresh(k,:);
    location_of_above_thresh=find(temp);
    dist_between_loc=diff(location_of_above_thresh);
    ones_len=0;
    moose=1;
    for n=1:size(dist_between_loc,2)
        if dist_between_loc(n)==1
            ones_len=ones_len+1;
        else
            if ones_len~=0
                actual_ones_len(moose)=ones_len;
                moose=moose+1;
            end
            ones_len=0;
        end
    end
    if ones_len~=0
        actual_ones_len(moose)=ones_len;
    end
    center_of_mass=obj.centermass(k).Centroid;
    if moose>=2
        hold on
        plot(center_of_mass(1),center_of_mass(2),'ko','MarkerSize', 10);
        hold off
        fert_count=fert_count+1;
    end
end
```

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

I claim:

1. A fertilization test method comprising:
inputting a sample image to a processor, the sample image having a plurality of pixels and an image border;
the processor detecting contours in the sample image;
the processor identifying one or more cells in the sample image based on the detected contours in the sample image;
the processor calculating at least one cell property for each of the one or more cells identified in the sample image, the at least one property selected from the group consisting of a cell body area, a cell body radius, a cell body diameter, a major diameter of an ellipse inscribing the cell body, a minor diameter of an ellipse inscribing the cell body, a major axis of a parabola inscribing the cell body, a minor axis of a parabola inscribing the cell body, coordinates of a cell location, coordinates of a cell body centroid, coordinates of a cell body boundary; a bounding box enclosing the cell, and a bounding box enclosing the cell and cell membrane,
the processor defining an outer search limit selected from the group consisting of (i) a bounding box within the image border and enclosing one of the one or more cell bodies based on the calculated at least one cell property, (ii) a bounding region within the image border, and (iii) the image border;
the processor determining a search area outside of a cell body and within the outer search limit to search for cell membrane edges;
the processor defining a cell outline having a cell outline size, the cell outline selected from the group consisting of (i) a cell hull based on the cell body boundary, (ii) the cell body boundary, and (iii) a plurality of points making up the cell body boundary;
the processor finding at least one cell membrane edge in the search area by adjusting the cell outline size between the cell body boundary and the outer search limit and checking for matches between the cell outline and the detected cell membrane edges;
the processor determining whether a cell is fertilized based on matches selected from the group consisting of (i) matches between the cell outline and the detected cell membrane edges, wherein a cell is determined to be fertilized when the cell has a first membrane edge radially spaced from a second membrane edge and wherein the first membrane edge and the second membrane edge each match detected edges in the sample image to at least the extent of a match threshold value, (ii) an alternating pattern on a first cell radial line segment and an alternating pattern on a second cell radial line segment, wherein the cell is determined to be fertilized when the alternating pattern on the first cell radial line segment matches the alternating pattern on the second cell radial line segment each alternating pattern indicates a region radially between the cell body boundary and a first cell membrane edge, a first cell membrane edge, a region radially between the first cell membrane edge and a second cell membrane edge, the second cell membrane edge, and a region radially beyond the second cell membrane edge, and (iii) circles fit to match each of a first membrane edge and a second membrane edge; and
the processor calculating a ratio of fertilized cells in the sample image; wherein the method is for measuring the contaminant level in a water sample.

2. The method of claim 1, further comprising:
excluding from analysis a cell having a cell body area outside of values between a maximum cell size threshold value and a minimum cell size threshold value.

3. The method of claim 2, wherein the minimum cell size threshold value is about 1 pixel per 24 sample image pixels.

4. The method of claim 2, wherein the maximum cell size threshold value is about 1 pixel per 12 sample image pixels.

5. The method of claim 1, further comprising:
excluding from analysis a connected pixel region in the sample image having an area below an area threshold value.

6. The method of claim 1, further comprising:
calculating a cell body boundary goodness-of-fit with a Gaussian ring having a radius based on the calculated at least one cell property; and
excluding from analysis a cell having a goodness-of-fit value below a fit threshold value.

7. The method of claim 6, wherein the cell body boundary goodness-of-fit is at least 200 based on two-dimensional cross-correlation between a pixel array including the cell boundary and a pixel array including the Gaussian ring.

8. The method of claim 1, further comprising excluding from analysis cells having a pixel connected to a pixel of the sample image border.

9. The method of claim 1, further comprising acquiring the sample image.

10. The method of claim 1, further comprising the step of removing noise pixels from the sample image, wherein the noise pixels comprise at least one of bright noise pixels and dark noise pixels.

11. The method of claim 10, wherein the noise pixels comprise a connected pixel area that is less than 3% of the minimum cell size threshold value.

12. The method of claim 1, wherein determining whether a cell is fertilized is based on matches between the cell outline and the detected cell membrane edges and wherein the match threshold value is fifteen percent.

13. The method of claim 1, wherein the cell outline size is adjusted in increments of one pixel.

14. The method of claim 1, wherein determining whether a cell is fertilized is based on matches between the cell outline and the detected cell membrane edges and further comprises:
determining locations where the cell outline matches a detected edge for each cell outline size; and
determining a number of consecutive matches for cell outline sizes between the cell body boundary and the outer search limit.

15. The method of claim 14, wherein the first membrane edge is indicated by an occurrence of matches between the cell outline and the detected edge for at least two consecutive cell outline sizes.

16. The method of claim 14, wherein the second membrane edge is indicated by an occurrence of matches between the cell outline and the detected edge for at least two consecutive cell outline sizes.

17. The method of claim 16, wherein the second membrane edge being radially spaced from the first membrane edge is indicated by a region of matches to an extent below the match threshold value between the first membrane edge and the second membrane edge.

18. The method of claim 1, wherein the edge is defined by change in pixel brightness.

19. The method of claim 1, further comprising:
dilating one or more pixels; and
eroding one or more pixels;
wherein dilating and eroding are performed using at least one structuring element selected from the group consisting of a disk-shaped structuring element, a rectangular structuring element, a horizontal line structuring element, and a vertical line structuring element.

20. The method of claim 1, wherein the method is performed using a MATLAB computing platform.

* * * * *